United States Patent
Tada et al.

(10) Patent No.: US 9,864,457 B2
(45) Date of Patent: Jan. 9, 2018

(54) DISPLAY DEVICE WITH TOUCH SENSOR

(71) Applicant: Sharp Kabushiki Kaisha, Osaka-shi, Osaka (JP)

(72) Inventors: Kenshi Tada, Osaka (JP); Hiroyuki Ogawa, Osaka (JP); Yasuhiro Sugita, Osaka (JP); Shinji Yamagishi, Osaka (JP); Jean Mugiraneza, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/030,927

(22) PCT Filed: Aug. 22, 2014

(86) PCT No.: PCT/JP2014/072048
§ 371 (c)(1),
(2) Date: Apr. 21, 2016

(87) PCT Pub. No.: WO2015/059995
PCT Pub. Date: Apr. 30, 2015

(65) Prior Publication Data
US 2016/0253030 A1 Sep. 1, 2016

(30) Foreign Application Priority Data
Oct. 22, 2013 (JP) .................................. 2013-219660

(51) Int. Cl.
*G06F 3/045* (2006.01)
*G06F 3/041* (2006.01)
(Continued)

(52) U.S. Cl.
CPC ...... *G06F 3/0416* (2013.01); *G02F 1/134336* (2013.01); *G02F 1/136209* (2013.01);
(Continued)

(58) Field of Classification Search
CPC ................................ G06F 3/044; G06F 3/0412
See application file for complete search history.

(56) References Cited

U.S. PATENT DOCUMENTS

2006/0215079 A1* 9/2006 Suzuki .............. G02F 1/133502
349/96
2010/0182273 A1 7/2010 Noguchi et al.
(Continued)

FOREIGN PATENT DOCUMENTS

JP 2009-244958 A 10/2009
JP 2009-259063 A 11/2009
(Continued)

OTHER PUBLICATIONS

Official Communication issued in International Patent Application No. PCT/JP2014/072048, dated Oct. 21, 2014.

*Primary Examiner* — Nan-Ying Yang
(74) *Attorney, Agent, or Firm* — Keating & Bennett, LLP

(57) ABSTRACT

A display device with a touch sensor (100) according to an embodiment of the present invention includes: a pixel substrate (20) including a plurality of pixel electrodes (2); a counter substrate (10) opposing the pixel substrate (20); a black matrix (8) extending in a first direction and in a second direction different from the first direction; and a touch sensor electrode (6) extending in the first direction. In a plan view where the counter substrate (10) is seen from a direction vertical to a planar direction of the counter substrate (10), a width in the second direction of a line of the black matrix (8) extending in the first direction is larger than a width in the first direction of a line of the black matrix (8) extending in the second direction; a width (W1) in the second direction of a line of the touch sensor electrode (6) extending in the first direction is smaller than a width (W2) in the second direction of the line of the black matrix (8) extending in the first direction; and the line of the touch sensor electrode (6)

(Continued)

extending in the first direction and the line of the black matrix (8) extending in the first direction overlap each other.

20 Claims, 30 Drawing Sheets

(51) Int. Cl.
  *G06F 3/044* (2006.01)
  *G02F 1/1343* (2006.01)
  *G02F 1/1362* (2006.01)
(52) U.S. Cl.
  CPC .............. *G06F 3/041* (2013.01); *G06F 3/044* (2013.01); *G06F 3/0412* (2013.01); *G06F 2203/04103* (2013.01); *G06F 2203/04111* (2013.01)

(56) References Cited

U.S. PATENT DOCUMENTS

| 2012/0044178 | A1* | 2/2012 | Song | G06F 3/0412 |
| | | | | 345/173 |
| 2012/0105337 | A1* | 5/2012 | Jun | G06F 3/0412 |
| | | | | 345/173 |
| 2012/0268418 | A1 | 10/2012 | Ishizaki et al. | |
| 2013/0027317 | A1* | 1/2013 | Hsiao | G06F 3/0416 |
| | | | | 345/173 |
| 2013/0135540 | A1* | 5/2013 | Nam | G02F 1/136286 |
| | | | | 349/12 |
| 2014/0168161 | A1 | 6/2014 | Sugita et al. | |

FOREIGN PATENT DOCUMENTS

| JP | 2012-079238 A | 4/2012 |
| JP | 2012-226687 A | 11/2012 |
| WO | 2013/018625 A1 | 2/2013 |

\* cited by examiner (a)

(b)

(a)

(b)

(a)

(b)

(a)

(b)

(a)

(b)

(a)

(b)

(a)

(b)

(a)

(b)

(a)

43, 47

(b)

10, 20

45

FPC (a)

(b)

(a)

(b)

(a)

(b)

(a)

(b)

DISPLAY DEVICE WITH TOUCH SENSOR

TECHNICAL FIELD

The present invention relates to a display device with a touch sensor, and particularly to a display device with a touch sensor of a capacitive type.

BACKGROUND ART

In recent years, display devices having a touch panel function of a capacitive type, which can be operated intuitively and which is capable of multi-point detection, have been drawing public attention. However, with such a display device, the thickness of the display device increases by the thickness of the touch panel substrate, and the display quality will be lowered because of a decrease in transmittance due to the touch panel substrate. Moreover, the terminal provision area of the touch panel substrate is separate from that of the display device, thereby making connections difficult.

As a mode to solve these problems, in-cell-type touch panels have been under discussion, in which the touch sensor function is incorporated into the liquid crystal display device itself. This is to address problems, such as the provision of touch sensor electrodes inside the liquid crystal display device, which complicates the display device manufacturing process, the touch sensor electrodes affecting the display quality, the inability to increase the driving frequency, thereby limiting the realization of large-size products.

Patent Document No. 1 discloses a liquid crystal display device, in which the common electrode is utilized also as a driving electrode of the touch sensor, and the detection electrode is formed on the opposite side of the counter substrate from the liquid crystal layer. While the common driving signal applied to the common electrode is to determine the display voltage of each pixel together with the pixel voltage applied to the pixel electrode, it serves also as the driving signal for the touch sensor.

CITATION LIST

Patent Literature

[Patent Document No. 1] Japanese Laid-Open Patent Publication No. 2009-244958

SUMMARY OF INVENTION

Technical Problem

With the liquid crystal display device of Patent Document No. 1, there are areas where the pixel portion is completely covered by the driving electrode and the detection electrode, and electrodes other than transparent electrodes cannot therefore be used for the driving electrode and the detection electrode, which increases the resistance value and makes it difficult to realize large-size products. Moreover, since the common electrode is driven with a common driving signal for image display, and the common driving signal is used also as a driving signal for the touch sensor, thereby imposing limitations on the driving signal for the touch sensor. For example, it is difficult to realize a mode in which a plurality of driving electrodes are driven simultaneously using orthogonal code signals.

The present invention has been made to solve at least one of the problems set forth above, and it is an object of the present invention to provide a display device with a touch sensor with a high precision, of which the display quality is prevented from being lowered by the touch sensor electrode.

Solution to Problem

A display device with a touch sensor according to an embodiment of the present invention is a display device with a touch sensor including a pixel substrate including a plurality of pixel electrodes, and a counter substrate opposing the pixel substrates, the display device with a touch sensor further including: a black matrix extending in a first direction and in a second direction different from the first direction; and a touch sensor electrode extending in the first direction, wherein: in a plan view where the counter substrate is seen from a direction vertical to a planar direction of the counter substrate, a width in the second direction of a line of the black matrix extending in the first direction is larger than a width in the first direction of a line of the black matrix extending in the second direction; a width in the second direction of a line of the touch sensor electrode extending in the first direction is smaller than the width in the second direction of the line of the black matrix extending in the first direction; and the line of the touch sensor electrode extending in the first direction and the line of the black matrix extending in the first direction overlap each other.

In one embodiment, the line of the touch sensor electrode extending in the first direction may overlap, by being positioned within an extent between opposite ends in the second direction of, the line of the black matrix extending in the first direction, as seen in the plan view.

In one embodiment, the touch sensor electrode may be covered with a transparent resin.

In one embodiment, the touch sensor electrode may be a transparent electrode, and a sheet resistance value of the touch sensor electrode may be 1 to 100 Ω/square.

In one embodiment, an electrically-floating dummy electrode may be provided in one or more of a plurality of pixel areas of the counter substrate where the touch sensor electrode is absent.

In one embodiment, the touch sensor electrode may be provided on the counter substrate and used as a driving electrode of the touch sensor; and a common electrode provided on the pixel substrate may be used as a detection electrode of the touch sensor.

In one embodiment, the common electrode may be divided along a signal wire provided on the pixel substrate.

In one embodiment, the display device with a touch sensor may further include an integration circuit receiving a signal corresponding to an amount of charge of the common electrode, wherein a reference voltage of the integration circuit is the same as a voltage applied to the common electrode during an image writing period.

In one embodiment, the integration circuit may include a single-ended operational amplifier.

In one embodiment, the integration circuit may include a fully differential operational amplifier; and the fully differential operational amplifier may receive signals corresponding to amounts of charge of the common electrodes adjacent to each other.

In one embodiment, an auxiliary wire electrically connected to the common electrode may be provided so as to overlap a signal wire provided on the pixel substrate.

In one embodiment, the display device with a touch sensor may be a liquid crystal display device of a transverse electric field mode.

In one embodiment, the display device with a touch sensor may be a liquid crystal display device which drives a negative-type liquid crystal material in a transverse electric field mode.

In one embodiment, a driving electrode wire of the touch sensor and a detection electrode wire of the touch sensor may be provided on the pixel substrate.

In one embodiment, an auxiliary wire electrically connected to the common electrode may be provided so as to overlap a signal wire provided on the pixel substrate; and the driving electrode wire and the detection electrode wire may be provided in the same layer as the auxiliary wire.

In one embodiment, the driving electrode wire may be provided so as to overlap a gate driver provided on the pixel substrate.

In one embodiment, the detection electrode wire may be provided so as to overlap a signal line connection wire provided on the pixel substrate.

In one embodiment, a seal portion for bonding together the pixel substrate and the counter substrate may include a conductive material; and the driving electrode wire provided on the pixel substrate and the driving electrode provided on the counter substrate may be electrically connected to each other via the seal portion.

In one embodiment, an image display terminal and a touch sensor driving terminal may be provided at one end of the pixel substrate.

In one embodiment, the touch sensor electrode may be either a metal electrode or a laminate between a transparent electrode and a metal layer.

In one embodiment, a touch position detecting operation may be synchronized with an image display operation, and the touch position detecting operation may be performed while there is no image writing.

In one embodiment, the touch position detecting operation may be performed by using orthogonal code signals generated by M-sequence.

In one embodiment, the touch sensor electrode may be provided on the counter substrate and used as a driving electrode of the touch sensor; and a detection electrode of the touch sensor may be provided at a position closer to a touch surface than a driving electrode of the touch sensor on the counter substrate.

In one embodiment, the display device with a touch sensor may be a liquid crystal display device of a transverse electric field mode.

In one embodiment, the display device with a touch sensor may be a liquid crystal display device which drives a negative-type liquid crystal material in a transverse electric field mode.

In one embodiment, the display device with a touch sensor may be a liquid crystal display device which drives a positive-type liquid crystal material in a transverse electric field mode.

In one embodiment, the display device with a touch sensor may be a liquid crystal display device which drives a negative-type liquid crystal material in a vertical electric field mode.

Advantageous Effects of Invention

An embodiment of the present invention provides a display device with a touch sensor with a high precision, of which the display quality is prevented from being lowered by the touch sensor electrode.

DESCRIPTION OF EMBODIMENTS

Figure 1:
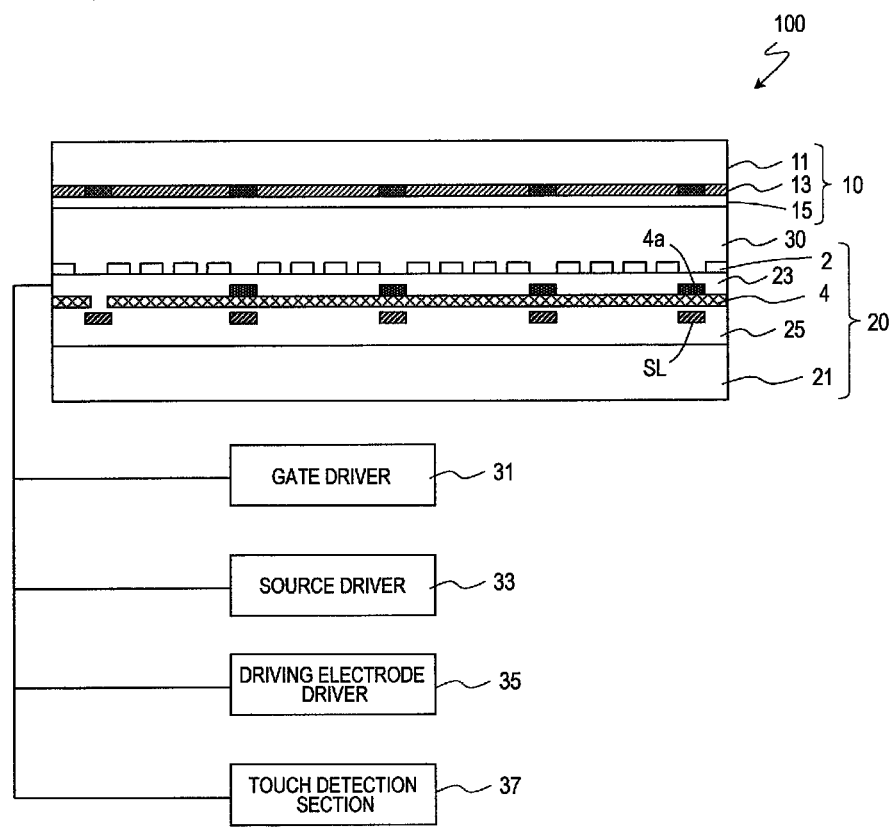
FIG. 1 A diagram showing a display device with a touch sensor according to an embodiment of the present invention.

A display device with a touch sensor according to an embodiment of the present invention will now be described with reference to the drawings. Note that elements having substantially the same function will be denoted by like reference numerals, and the description thereof may be omitted. While a TFT-type LCD is illustrated hereinbelow as the display device, the display panel is not limited to a TFT-type LCD, but it is needless to say that it may be any of various other display panels having a display medium layer other than a liquid crystal layer as the display medium layer, e.g., organic EL display panels and electrophoretic display panels. Where a liquid crystal display device is used as the display device, the present invention is applicable to either a liquid crystal display device of a vertical electric field mode or a liquid crystal display device of a transverse electric field mode.

Embodiment 1

FIG. 1 is a diagram showing a display device 100 with a touch sensor according to an embodiment of the present invention. The display device 100 with a touch sensor includes a TFT substrate (pixel substrate) 20, a counter substrate 10 provided on the observer side of the TFT substrate 20, and a liquid crystal layer 30 provided between the TFT substrate 20 and the counter substrate 10.

The TFT substrate 20 includes a glass substrate 21, and a pixel electrode 2 and a common electrode 4 for applying a voltage across the liquid crystal layer 30. An insulating layer 25 is provided between the glass substrate 21 and the common electrode 4, and an insulating layer 23 is provided between the common electrode 4 and the pixel electrode 2. The common electrode 4 is used also as a detection electrode of the touch sensor.

Figure 3:
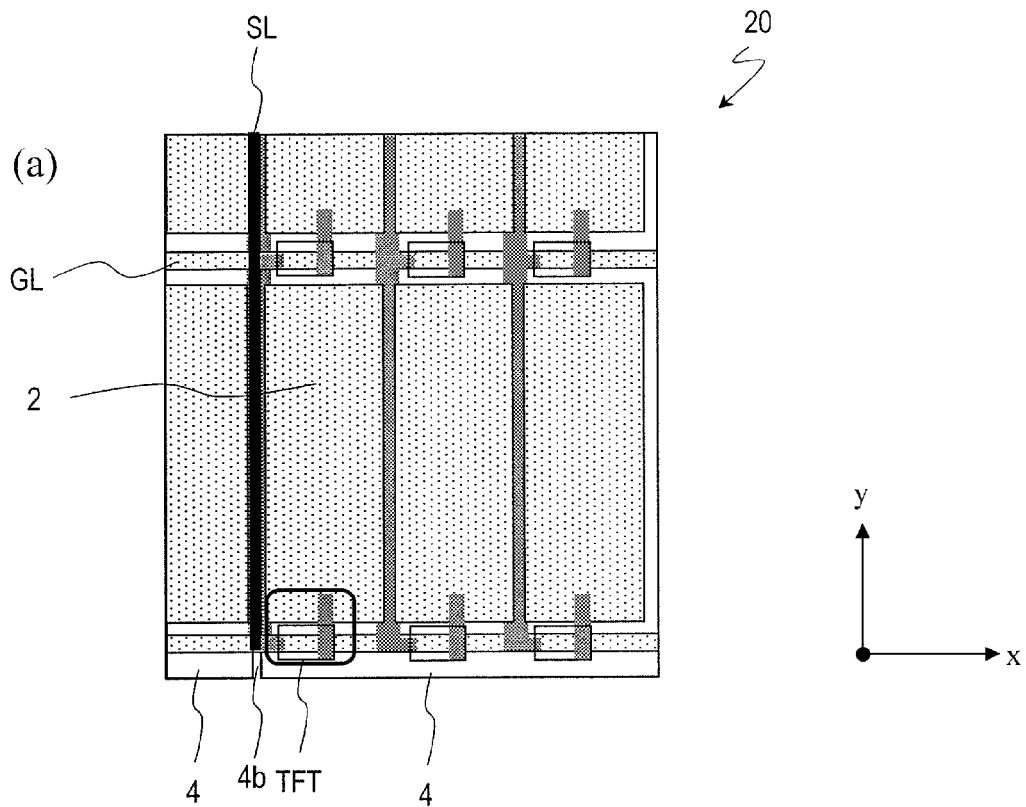
FIG. 3 (a) A diagram showing a main part of a TFT substrate according to an embodiment of the present invention, and (b) is a diagram showing a main part of a counter substrate according to an embodiment of the present invention.
Figure 3:
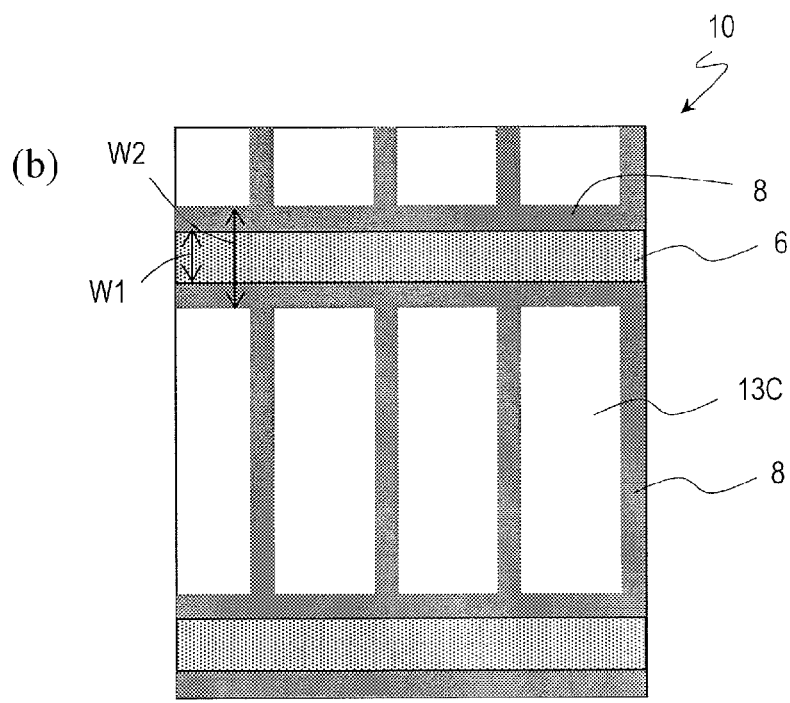

The counter substrate 10 includes a glass substrate 11, a color filter layer 13 and a resin layer 15. A driving electrode 6 (FIG. 3) of the touch sensor is provided at a position on the liquid crystal layer 30 side of the color filter layer 13.

The display device 100 with a touch sensor also includes a gate driver 31 for supplying a scanning signal to TFT elements provided in the pixel area via scanning signal lines GL, a source driver 33 for supplying a pixel signal to TFT elements via pixel signal lines SL, a driving electrode driver 35 for supplying a driving signal to the driving electrode 6, and a touch detection section 37 for detecting a touch by receiving a signal supplied from the common electrode 4 (detection electrode). Note that the display device 100 with a touch sensor, as used herein, may refer to a configuration in which the TFT substrate 20 and the counter substrate 10 are attached together with the liquid crystal layer 30 interposed therebetween, without at least one of these circuits 31, 33, 35 and 37.

Figure 2:
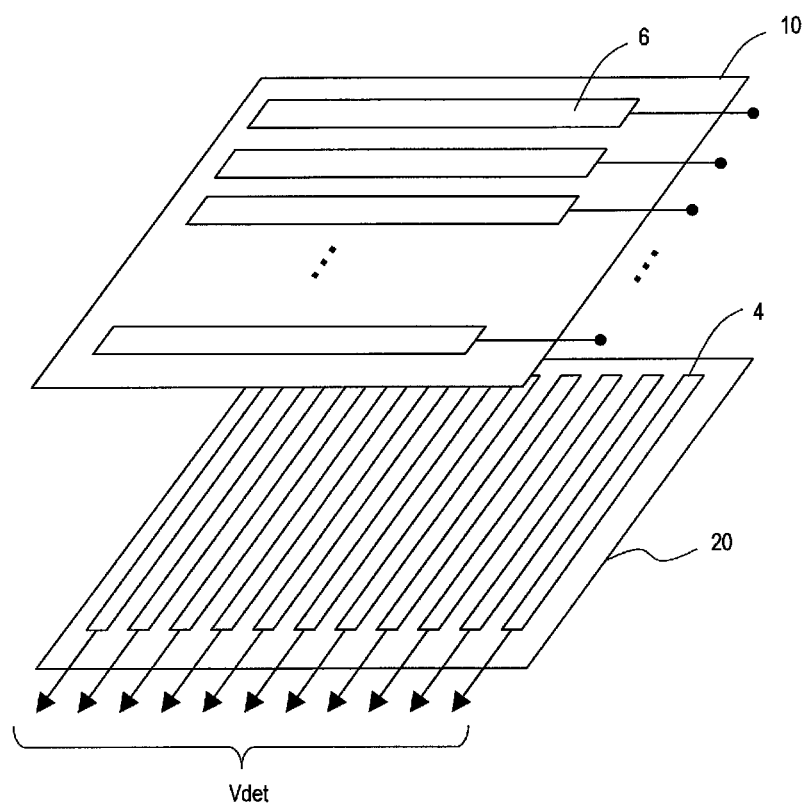
FIG. 2 A diagram illustrating a method for detecting a touch according to an embodiment of the present invention.

Next, referring to FIG. 2, a method for detecting a touch will be described. The touch sensor includes driving electrodes 6 provided on the counter substrate 10, and detection electrodes 4 provided on the TFT substrate 20. A plurality of driving electrodes 6, extending in the left-right direction of the figure, are provided on the counter substrate 10. In a touch-detecting operation, the driving electrodes 6 successively receive the driving signal V1 supplied from the driving electrode driver 35 so as to be successively scanned in a time-division manner. A plurality of detection electrodes 4 are each extending in a direction crossing the driving electrode 6, and are connected to the touch detection section 37. A capacitance is formed in an area where a driving electrode 6 and a detection electrode 4 intersect each other.

As the driving electrode driver 35 supplies the driving signal V1 to the driving electrodes 6, a touch detection signal Vdet is output from the detection electrodes 4 to the touch detection section 37, thus performing a touch-detecting operation. The electrode pattern with electrodes crossing each other forms capacitive touch sensors in a matrix pattern, and by scanning this across the entire touch detecting surface, it is possible to detect the presence/absence of a touch and identify the coordinates of the touch position.

Figure 4:
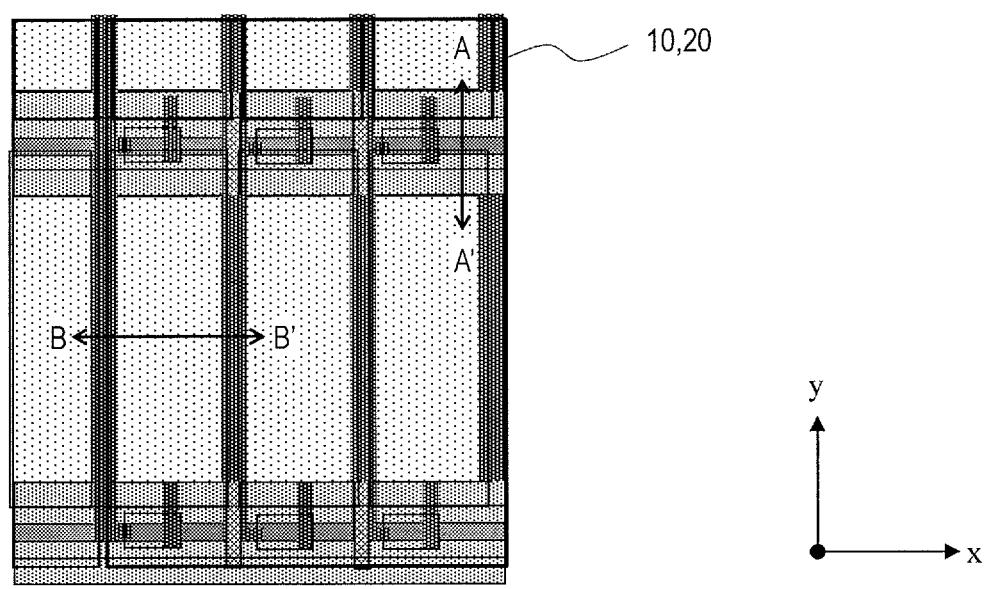
FIG. 4 A diagram showing a configuration including a TFT substrate and a counter substrate attached together according to an embodiment of the present invention.

Next, the driving electrode 6 of the present embodiment will be described in greater detail. FIG. 3(a) is a diagram showing a main part of the TFT substrate 20, and FIG. 3(b) is a diagram showing a main part of the counter substrate 10. FIG. 4 shows the TFT substrate 20 and the counter substrate 10 attached together. FIG. 5(a) is a cross-sectional view taken along line AA' shown in FIG. 4, and FIG. 5(b) is a cross-sectional view taken along line BB' shown in FIG. 4.

Figure 5:
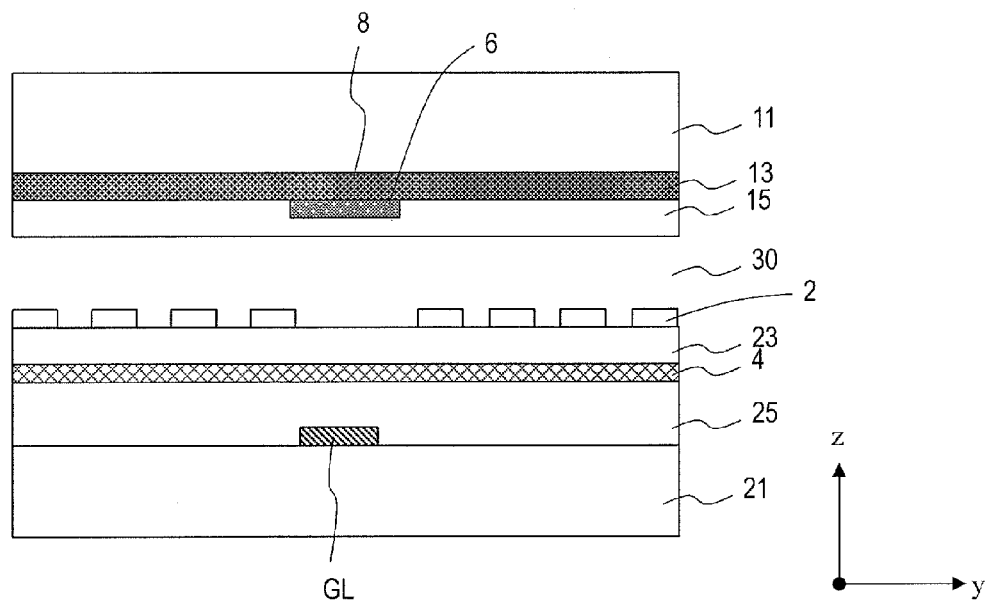
FIG. 5 (a) is a cross-sectional view taken along line AA' shown in FIG. 4, and (b) is a cross-sectional view taken along line BB' shown in FIG. 4.
Figure 5:
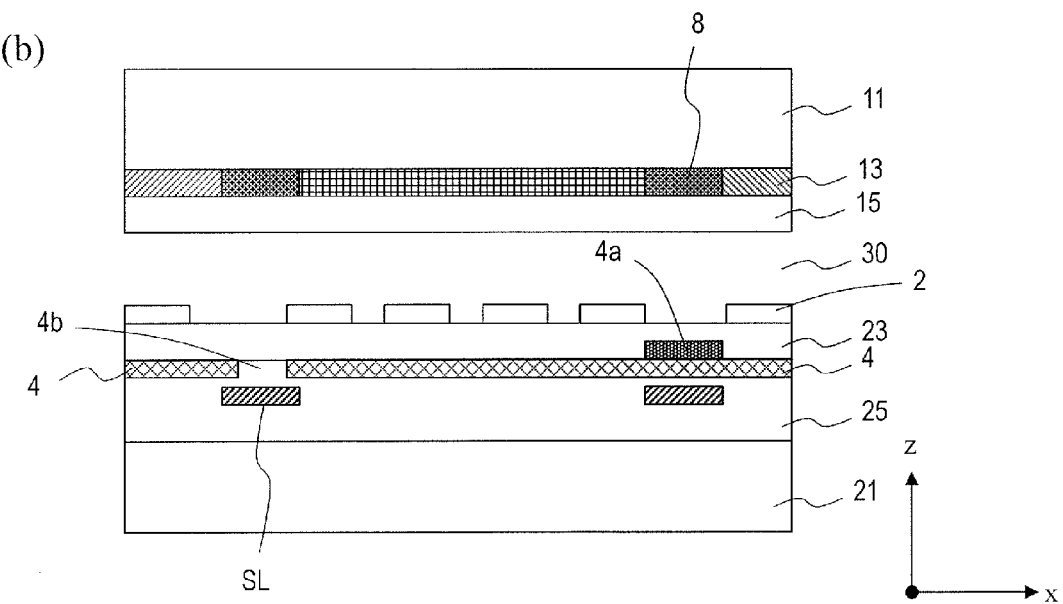

As shown in FIG. 5, the driving electrodes 6 and the detection electrodes 4 are formed on the liquid crystal layer 30 side of the counter substrate 10 and the TFT substrate 20, respectively. As shown in FIG. 3(a), scanning signal lines GL and pixel signal lines SL for inputting liquid crystal display signals to the pixel electrodes 2 are formed on the TFT substrate 20 so as to extend perpendicular to each other, and each pixel electrode 2 therebetween includes a TFT therein to be a switch. While the TFT illustrated in the figure is a reverse-staggered TFT in which the gate electrode is located closer to the glass substrate than the active layer, a staggered TFT may be used.

The common electrode 4 is formed in an area including the pixel electrodes 2, and is divided by a slit 4b along the pixel signal line SL as shown in FIG. 3(a). The common electrode 4 functions also as a detection electrode of the touch sensor. The common electrode 4 is formed between the pixel electrodes 2 and the glass substrate 21. The pixel electrodes 2 and the common electrode 4 are each formed by a transparent electrode.

As shown in FIG. 3(b), the counter substrate 10 includes a black matrix 8 to provide a light-blocking area on the liquid crystal layer 30 side, partitioning the device into unit cells of liquid crystal display. Color filters 13C of R, G and B, etc., are formed in the pixel areas of the color filter layer 13.

As shown in FIG. 5(b), an auxiliary wire 4a is provided on the common electrode 4. The auxiliary wire 4a may be arranged on the liquid crystal layer side, or on the opposite side, of the common electrode 4.

The driving electrode 6 is formed by a transparent electrode. The sheet resistance of the transparent electrode forming the driving electrode 6 is 1 to 100 Ω/square, for example. As shown in FIG. 3(b), the driving electrode 6 is formed so as to be included in a thick line extending in the horizontal direction (x direction) of the black matrix 8. The black matrix 8 extends in the x direction and in the y direction, and the width in the y direction of a line of the black matrix 8 extending in the x direction is larger than the width in the x direction of a line of the black matrix 8 extending in the y direction. In a plan view where the counter substrate 10 is seen from a direction (z direction) vertical to the planar direction (xy direction) of the counter substrate 10, the width W1 of a line of the driving electrode 6 extending in the x direction is smaller than the width W2 in the y direction of a line of the black matrix 8 extending in the x direction, and the line of the driving electrode 6 extending in the x direction and the line of the black matrix 8 extending in the x direction overlap each other. More specifically, as seen in a plan view, the line of the driving electrode 6 extending in the x direction overlaps, by being positioned within the extent between opposite ends in the y direction of, the line of the black matrix 8 extending in the x direction, and the driving electrode 6 is completely covered by the black matrix 8.

The driving electrode 6 is arranged under the thick black matrix pattern extending in the scanning line direction of the counter substrate 10, and is arranged with a smaller width than the black matrix pattern. In this way, it is possible to form a touch sensor electrode pattern on the counter substrate, where high-precision patterning is difficult. Moreover, it is possible to eliminate the influence of the touch sensor electrode on the display quality. According to the embodiment of the present invention, as compared with conventional modes, light passing through the pixel area does not pass through the driving electrode, which is formed by a transparent conductive film, and it is therefore possible to realize a high display quality.

Since the driving electrodes 6 are arranged under the black matrix 8, the driving electrodes 6 formed on the counter substrate 10 can be formed by a material of a low resistance value, thereby enabling the realization of large-size devices. The driving electrodes 6 can be formed by a metal wire that has a low resistance value but blocks light, such as aluminum, for example, thereby enabling the realization of large-size devices.

Note that the driving electrodes 6 may be formed so as to overlap lines of the black matrix 8 extending in the y direction.

Where the liquid crystal display mode is the FFS or IPS mode, the common electrode on the TFT substrate side is used as the detection electrode. Then, all the electrodes that are needed for the touch sensor operation can be arranged within the liquid crystal display device, and it is possible to connect the liquid crystal display signal and the touch sensor signal using a single implementation area. Note that the common electrode is patterned in a direction orthogonal to the driving electrodes 6. On the TFT substrate side, it is possible to perform a high-resolution patterning that corresponds to the thinner line of the black matrix 8, and it is possible to accommodate a high-resolution display using the black matrix 8 of thin lines.

It is preferred that the auxiliary wire 4a is arranged, on the common electrode 4 on the TFT substrate side, so as to overlap the signal wire. Then, it is possible to reduce the resistance value of the detection electrode, and it is possible to realize large-size devices without affecting the display.

An integration circuit may be used for the touch detection circuit, and the image display voltage Vcom may be used as the reference voltage, the details of which will be described later. Then, the potential of the common electrode 4 is constant at Vcom both during an image writing operation and during a touch sensor operation, and the potential difference between the pixel electrode and the common electrode is retained also during a touch-detecting operation.

Next, referring to FIG. 6 to FIG. 8, the size and the electrode wire of the touch sensor basic pattern will be described.

FIG. 6(b) shows the touch sensor basic pattern TBP, and FIG. 6(a) is an enlarged view showing a portion P1 of FIG. 6(b). The size of the touch sensor basic pattern TBP formed by a driving electrode and a detection electrode of the touch sensor is about 1 mm to 6 mm, and a position detection unit 6u of the driving electrode includes a plurality of driving electrodes 6 extending along the black matrix 8. The common electrode 4 is used as the detection electrode, and the common electrode 4 is divided along the display signal wire, with each of the divided portions of the common electrode serving as a position detection unit 4u of the detection electrode. In the pixel area where the driving electrodes 6 are absent, a floating electrode 6d may be provided that is not electrically connected to other locations.

Figure 7:
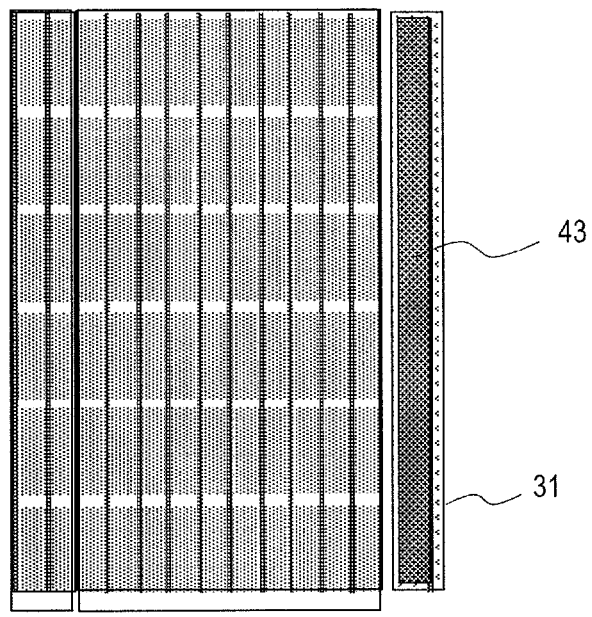
FIG. 7 (a) is a diagram showing a main part of a TFT substrate according to an embodiment of the present invention, and (b) is a diagram showing a TFT substrate according to an embodiment of the present invention.
Figure 7:
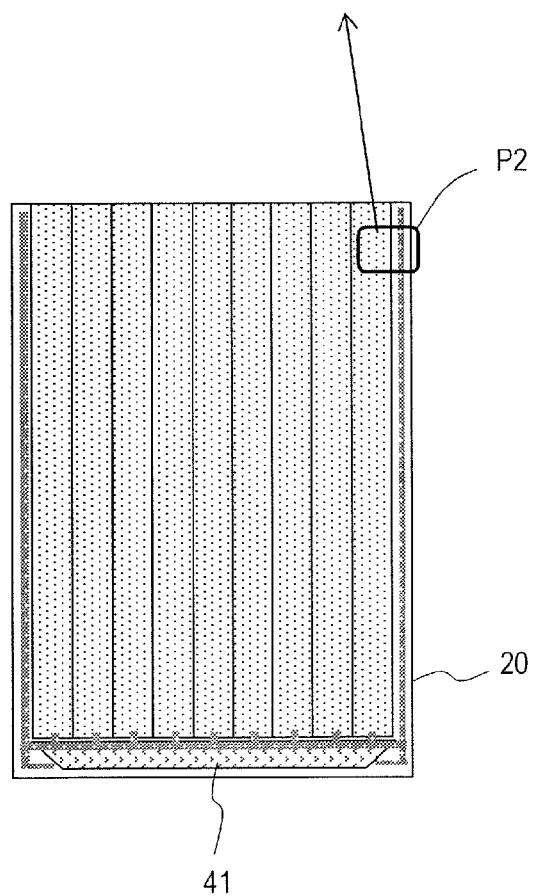
Figure 8:
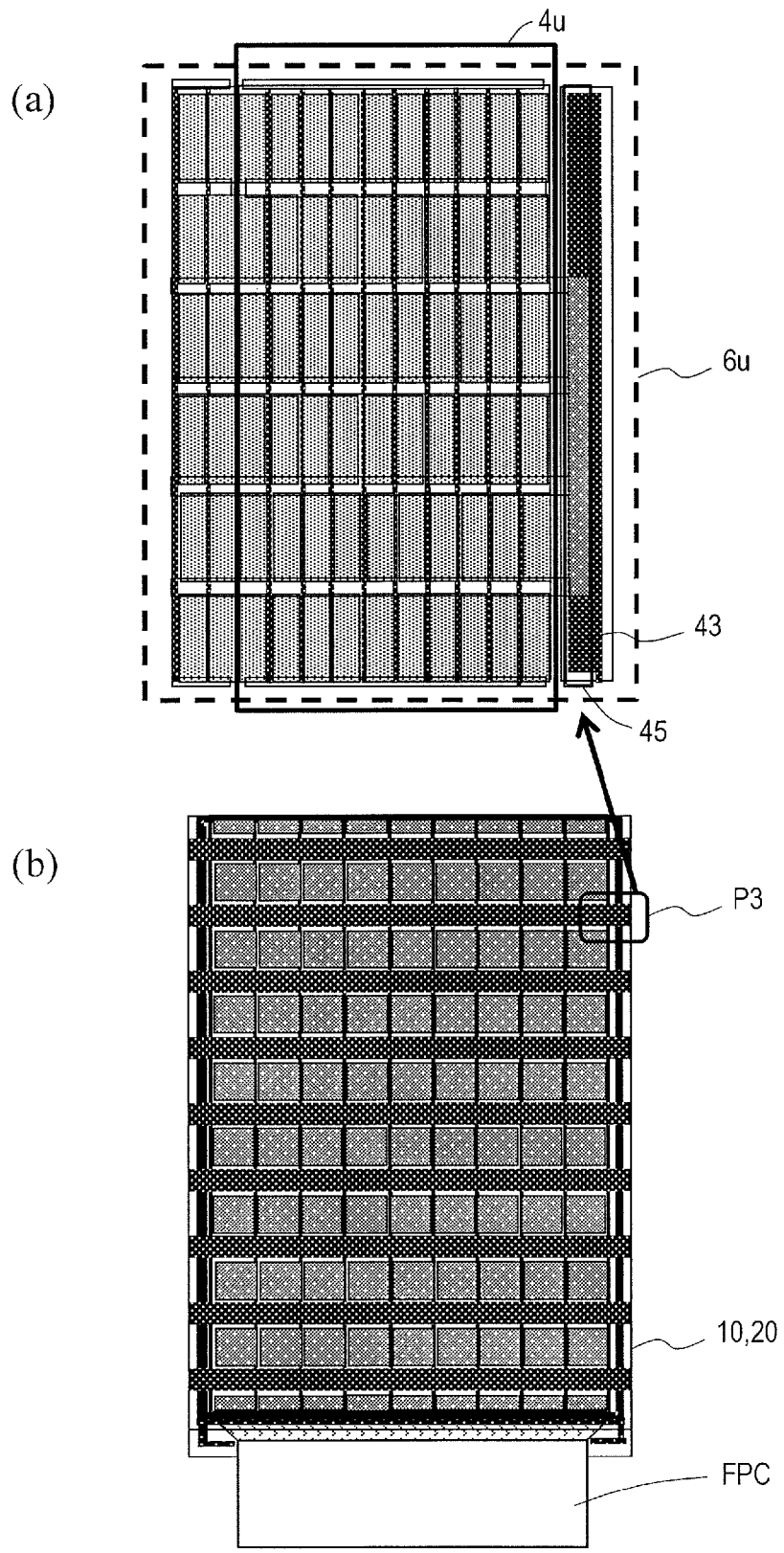
FIG. 8 (a) is a diagram showing a main part of a configuration including a counter substrate and a TFT substrate attached together according to an embodiment of the present invention, and (b) is a diagram showing a configuration including a counter substrate and a TFT substrate attached together according to an embodiment of the present invention.

FIG. 7(b) shows the TFT substrate 20, and FIG. 7(a) is an enlarged view showing a portion P2 of FIG. 7(b). As shown in FIG. 7, a wire 43 of the driving electrode 6 is provided on the TFT substrate 20. The driving electrode wire 43 on the TFT substrate may be provided so as to pass over the gate driver 31 formed on the TFT substrate. FIG. 8(b) shows the counter substrate 10 and the TFT substrate 20 attached together, and FIG. 8(a) is an enlarged view showing a portion P3 of FIG. 8(b). When the TFT substrate 20 and the counter substrate 10 are attached together, a conductive seal (including conductive beads) 45, or the like, that becomes conductive upon pressure-bonding only in the direction of pressure-bonding is used to connect together the wire 43 on the TFT substrate 20 side and the driving electrode 6 on the counter substrate 10 side. The liquid crystal display wire and the touch sensor wire are connected to a terminal area at one end of the liquid crystal display device after the attachment.

Note that the touch sensor driving electrode wire and the touch sensor detection electrode wire on the TFT substrate 20 may be formed by auxiliary wires. The touch sensor detection electrode wire on the TFT substrate may pass over a signal line connection wire 41 formed on the TFT substrate.

Figure 9:
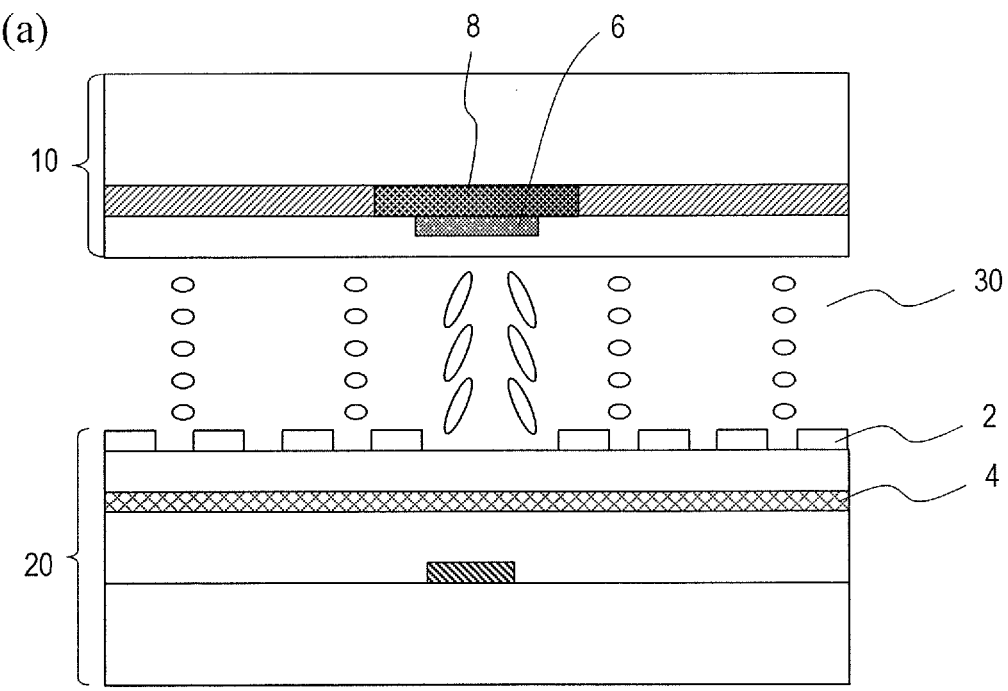
FIGS. 9 (a) and (b) are diagrams showing a behavior of the liquid crystal molecules where a positive-type liquid crystal material is used according to an embodiment of the present invention.
Figure 9:
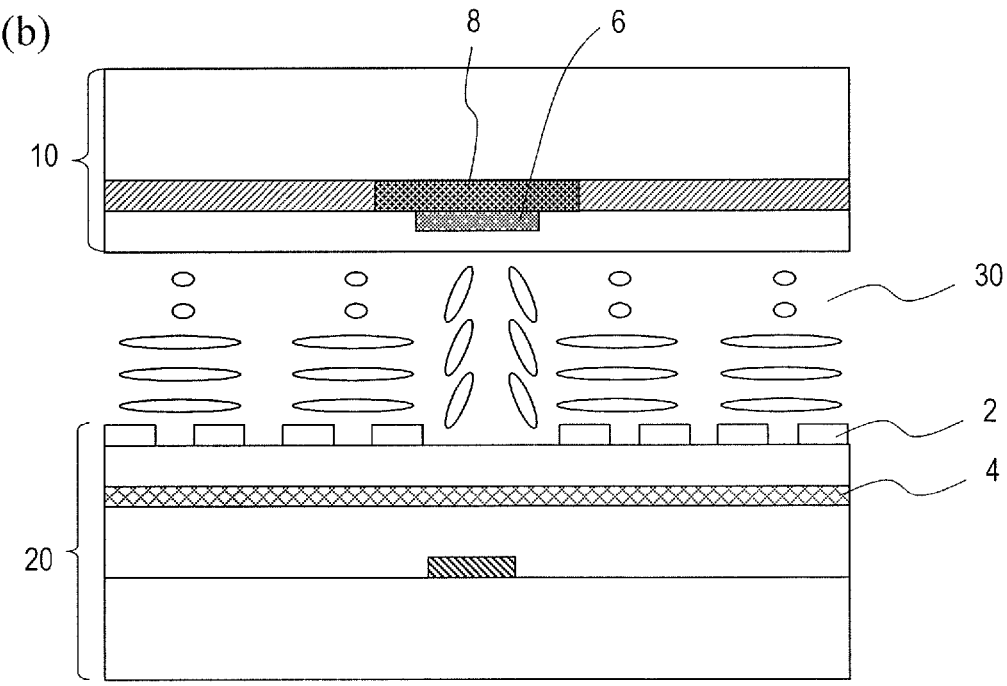
Figure 10:
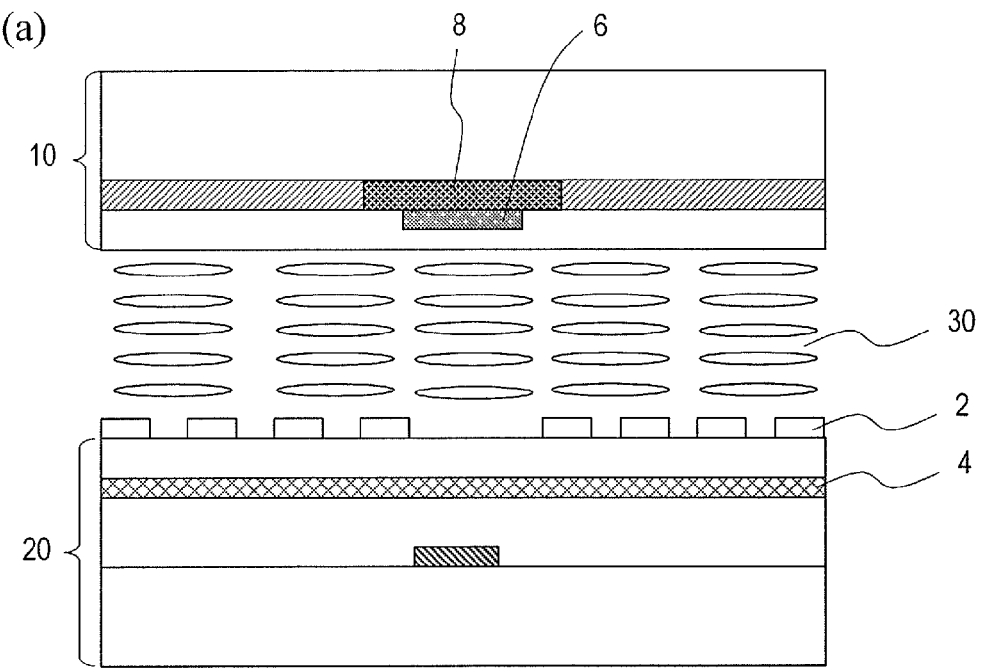
FIGS. 10 (a) and (b) are diagrams showing a behavior of the liquid crystal molecules where a negative-type liquid crystal material is used according to an embodiment of the present invention.
Figure 10:
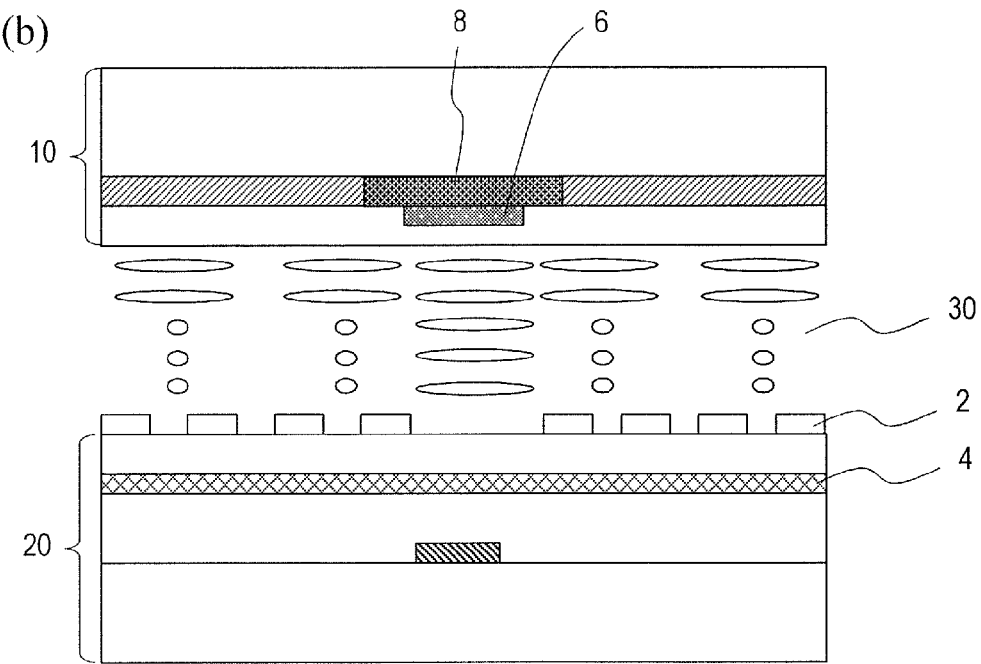

Next, referring to FIG. 9 and FIG. 10, the relationship between the arrangement of the touch sensor driving electrode 6 and the behavior of the liquid crystal molecules. In this example, the liquid crystal molecules are driven in the transverse electric field mode.

FIG. 9 shows a behavior of the liquid crystal molecules where a positive-type liquid crystal material of which the dielectric constant anisotropy is $\Delta\in>0$ is used. With the positive-type liquid crystal material, the long-axis direction of the liquid crystal molecules is oriented in the direction of the electric field. FIG. 9(a) shows a state where a voltage is applied to the driving electrode 6 and the common electrode 4, and FIG. 9(b) shows a state where a voltage is further applied to the pixel electrode 2 and the common electrode 4. When a voltage is applied to the pixel electrode 2 and the common electrode 4, the orientation of the liquid crystal molecules changes along the electric field that connects to the common electrode 4 through the slit of the pixel electrode 2.

FIG. 10 shows a behavior of the liquid crystal molecules where a negative-type liquid crystal material of which the dielectric constant anisotropy is $\Delta\in<0$ is used. With the negative-type liquid crystal material, the long-axis direction of the liquid crystal molecules is oriented in a direction perpendicular to the direction of the electric field. FIG. 10(a) shows a state where a voltage is applied to the driving electrode 6 and the common electrode 4, and FIG. 10(b) shows a state where a voltage is further applied to the pixel electrode 2 and the common electrode 4. As shown in FIG. 10, with the negative-type liquid crystal material, the orientation of the liquid crystal molecules changes so as to be perpendicular to the electric field.

When a voltage is applied to the driving electrode 6, with a positive-type liquid crystal material, liquid crystal molecules are oriented in a direction different from that of other liquid crystal molecules therearound due to the line of electric force between the driving electrode 6 and the common electrode (detection electrode) 4 as shown in FIG. 9, whereas with a negative-type liquid crystal material, the long-axis direction of the liquid crystal molecules is vertical to the direction of the line of electric force between the driving electrode 6 and the common electrode 4, and therefore the orientation does not change. In either case, it is an area shaded by the black matrix 8 and there is little influence on the display, but it is nevertheless preferred to use a negative-type liquid crystal material with which the touch sensor driving operation has substantially no influence on the behavior of the liquid crystal molecules.

Figure 11:
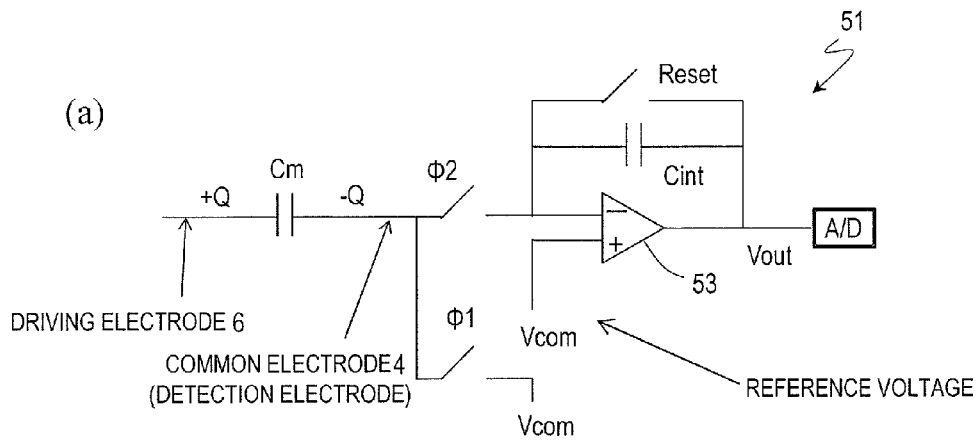
FIG. 11 (a) is a diagram showing a touch detection circuit according to an embodiment of the present invention, and (b) is a diagram showing a driving timing for electrodes and switching elements according to an embodiment of the present invention.
Figure 11:
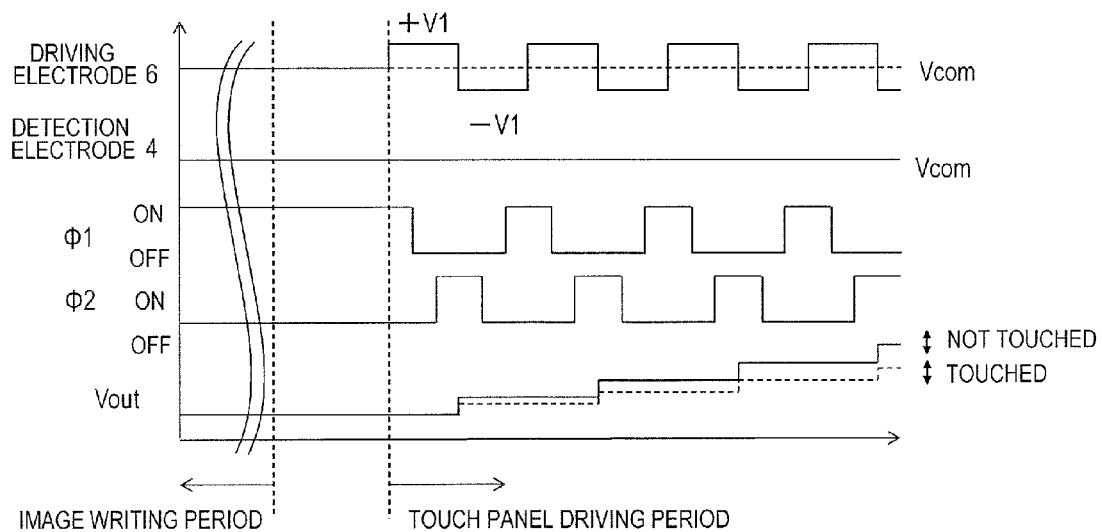

Next, the touch detection circuit will be described. FIG. 11(a) shows a touch detection circuit 51, and FIG. 11(b) shows a driving timing for electrodes and switching elements.

The touch detection circuit 51 is, for example, an integration circuit using an operational amplifier 53 of a singe-ended connection. The touch-detecting operation is synchronized with the liquid crystal display, and is performed while writing the image signal. For example, it is performed during one horizontal period or during one vertical period. In the example of FIG. 11(b), it is performed every vertical period. Where the reference voltage of an integration circuit 51 is assumed to be the common voltage Vcom as shown in the figure, the common electrode (detection electrode) 4 is constant at Vcom both during the image writing period and during the touch panel driving period, and it is possible to always keep constant the common electrode potential of the TFT substrate, which determines the liquid crystal display.

The touch-detecting operation will be described in greater detail. In FIG. 11(a), Cm is the capacitance between the driving electrode 6 and the detection electrode 4. In one vertical period of the image writing period, the driving electrode 6 and the detection electrode 4 are both constant at Vcom. After the image writing period, a positive voltage and a negative voltage, centered at Vcom, are applied to the driving electrode 6. While the switch Φ1 is ON, the driving electrode 6 is set to +V1 and an electric charge of Q is accumulated in the capacitance Cm, after which the switch Φ1 is turned OFF and the switch Φ2 is connected. Then, as the driving electrode 6 is set to −V1, 2Q is accumulated at Cint of the integrator, outputting Vout=2Q/Cint. Note that the integrated capacity Cint of the integration circuit is preferably reset at the start of the touch-detecting operation.

After an intended number of iterations of the operation described above, when there is a touch, the capacitance Cm is small and Vout therefore does not become as high as that when there is no touch, thus successfully detecting a touch. Since the reference voltage of the integration circuit 51 is set to Vcom, the common electrode/detection electrode, which is connected thereto, is constant at Vcom also during the touch panel driving period.

Figure 12:
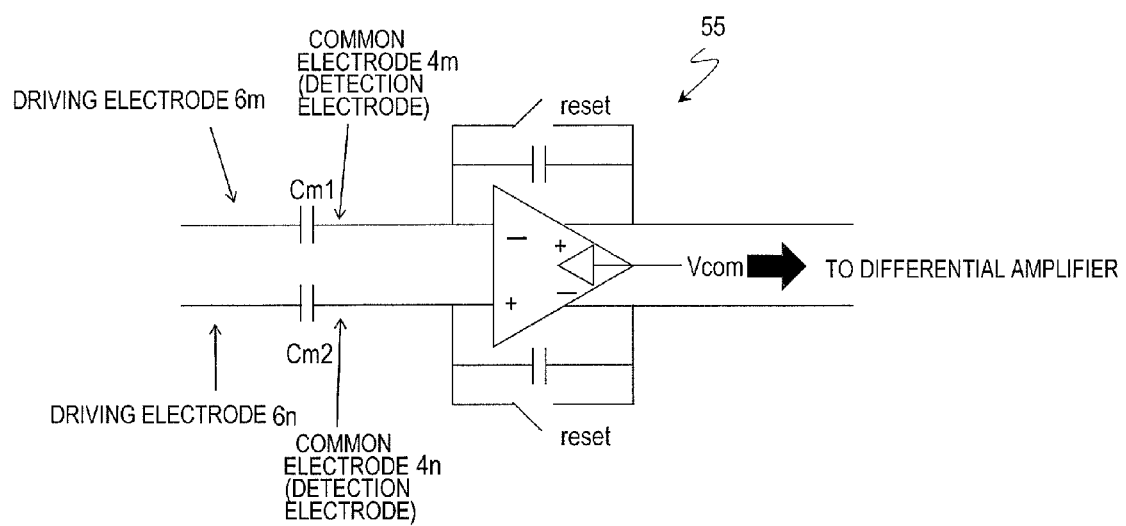
FIG. 12 A diagram showing a touch detection circuit in which a fully differential amplifier is used as an integration circuit according to an embodiment of the present invention.

A fully differential amplifier 55 as shown in FIG. 12 may be used as the integration circuit, wherein a touch/no-touch is detected based on the difference between adjacent detection electrodes, which is resistant against noise, thus enabling a touch detection with a high precision.

An orthogonal code system may be used, which involves simultaneously driving the driving electrodes by M-sequence generation and involves simultaneous detection and decoding. In the embodiment of the present invention, since the driving electrode 6 of the touch sensor is different from the common electrode 4, it is possible to drive the driving electrode 6 of the touch sensor independently of the display driving operation, and by simultaneously driving a plurality of driving electrodes using orthogonal code signals, it is possible to form a touch sensor having a high resistance against noise.

Next, the liquid crystal display device 100 with a touch sensor for driving liquid crystal molecules in the vertical electric field mode of the embodiment of the present invention will be described.

Figure 13:
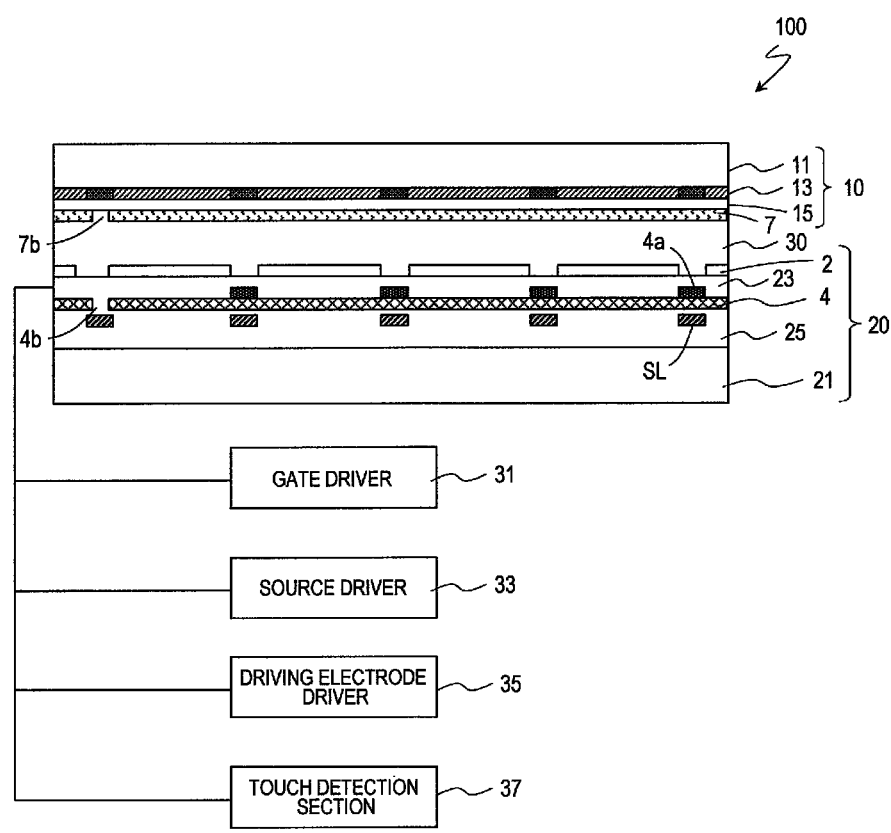
FIG. 13 A diagram showing a display device with a touch sensor according to an embodiment of the present invention.
Figure 15:
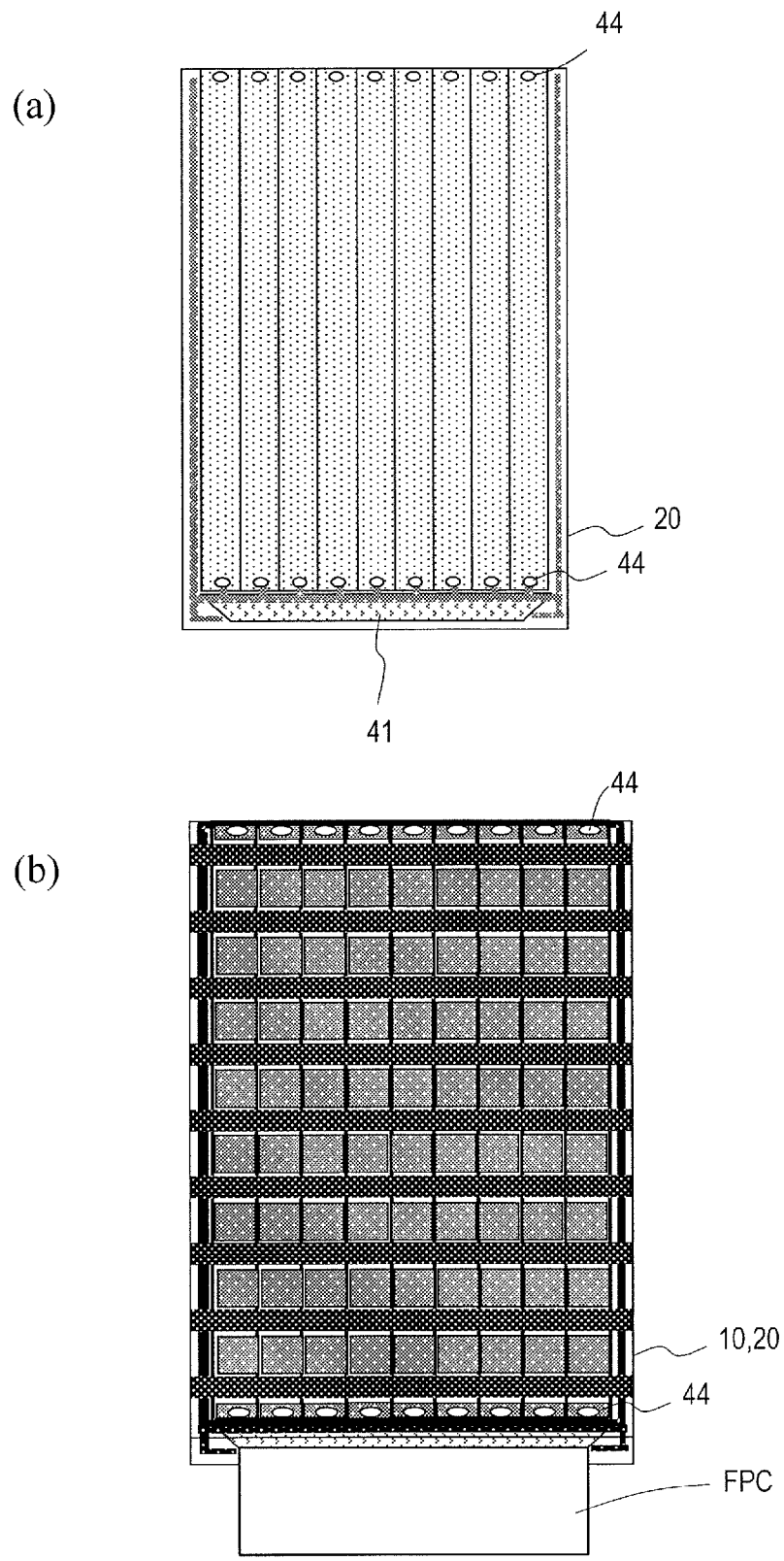
FIG. 15 (a) is a diagram showing a TFT substrate according to an embodiment of the present invention, and (b) is a diagram showing a configuration including a counter substrate and a TFT substrate attached together according to an embodiment of the present invention.

FIG. 13 is a diagram showing the liquid crystal display device 100 with a touch sensor for driving liquid crystal molecules in the vertical electric field mode according to the embodiment of the present invention. The liquid crystal display device 100 with a touch sensor shown in FIG. 13 includes a common electrode (counter electrode) 7 for image display is provided on the liquid crystal layer 30 side of the resin layer 15 of the counter substrate 10. Similar to the common electrode 4 of the TFT substrate 20, the common electrode 7 is divided by a slit 7b along the display signal wire. The common electrode 7 is electrically connected to the common electrode (detection electrode) 4 of the TFT substrate 20 by a conductive seal 44 (FIG. 15), and therefore the common electrode 7 functions as a detection electrode of the touch sensor. In this example, it is possible to detect the presence/absence of a touch by detecting a change in the capacitance between the driving electrode 6 and the common electrode 7.

Figure 14:
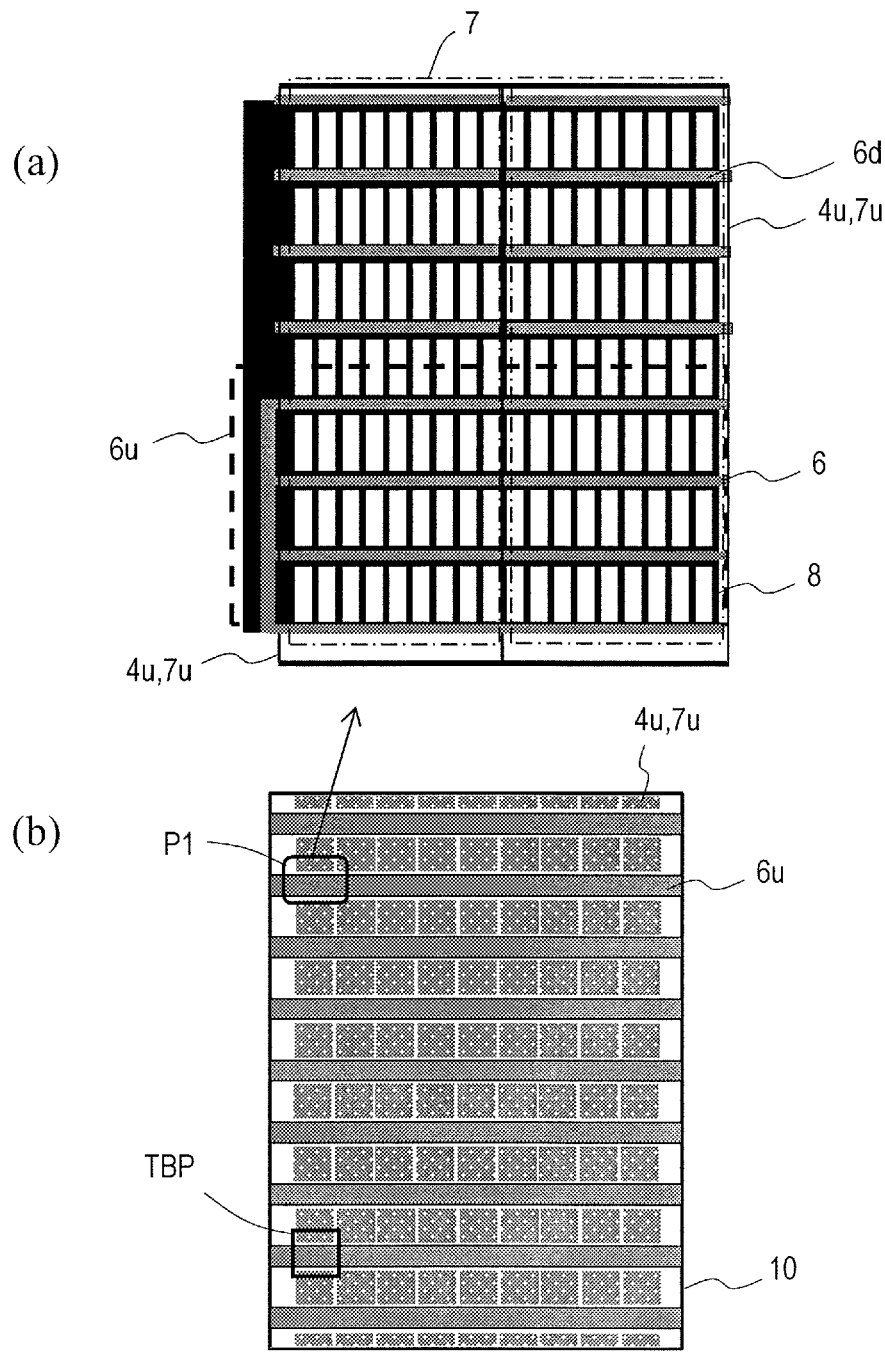
FIG. 14 (a) is a diagram showing a main part of a counter substrate according to an embodiment of the present invention, and (b) is a diagram showing a touch sensor basic pattern according to an embodiment of the present invention.

FIG. 14(b) is a diagram showing the touch sensor basic pattern TBP, and FIG. 14(a) is an enlarged view showing a portion P1 of FIG. 14(b). The size of the touch sensor basic pattern TBP formed by a driving electrode and a detection electrode of the touch sensor is about 1 mm to 6 mm, and a position detection unit 6u of the driving electrode includes a plurality of driving electrodes 6 extending along the black matrix 8. Similar to the common electrode 4, the common electrode 7, which is a detection electrode, is divided along the display signal wire, and each of the divided portions of the common electrodes 4 and 7 serves as position detection units 4u and 7u of the detection electrode, respectively.

FIG. 15(a) shows the TFT substrate 20, and FIG. 15(b) shows a configuration including the counter substrate 10 and the TFT substrate 20 attached together. When the TFT substrate 20 and the counter substrate 10 are attached together, a conductive seal (including conductive beads) 44, or the like, that becomes conductive upon pressure-bonding only in the direction of pressure-bonding is used to electrically connect together the common electrode 4 on the TFT substrate 20 side and the common electrode 7 on the counter substrate 10 side. Since the common electrode 7 is coupled with the common electrode 4 via the capacitance formed by the liquid crystal layer 30 and the insulating layer 23, it is possible to substantially reduce the time constant for a signal detected at the common electrode 7 to reach the touch detection section 37 through the FPC. It is possible to further reduce the time constant by reducing the resistance value of the common electrode 4 by means of the auxiliary wire 4a.

Figure 16:
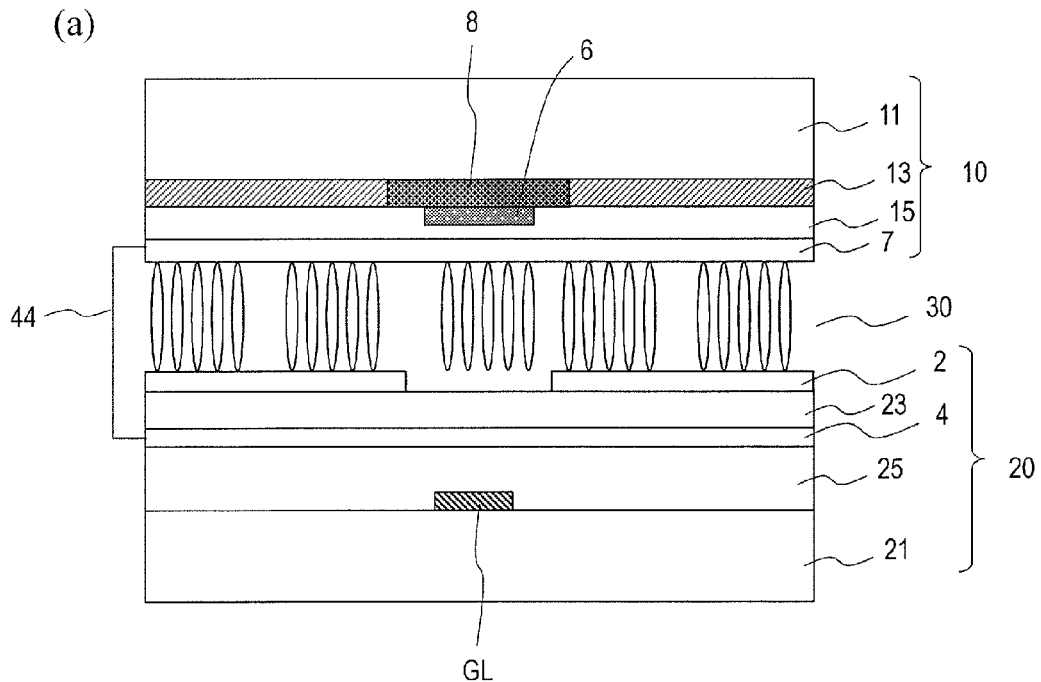
FIGS. 16 (a) and (b) are diagrams showing a display device with a touch sensor according to an embodiment of the present invention.
Figure 16:
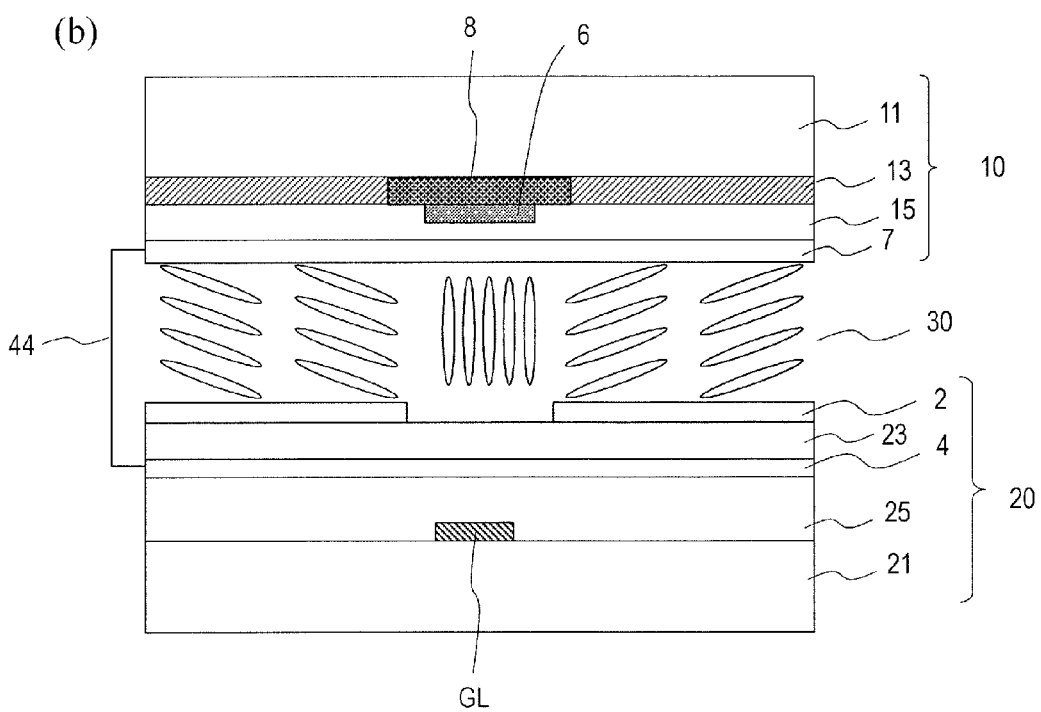

FIG. 16 is a diagram showing the display device 100 with a touch sensor of the vertical electric field mode of the present embodiment. FIG. 16(a) shows a state where a voltage is not applied (no electric field is generated) between the pixel electrode 2 and the common electrode 7, and FIG. 16(b) shows a state where a voltage is applied (an electric field is generated) between the pixel electrode 2 and the common electrode 7. When a voltage is applied between the pixel electrode 2 and the common electrode 7, the liquid crystal molecules are tilted by the line of electric force between the pixel electrode 2 and the common electrode 7 as shown in FIG. 16(b), thereby altering the display. With this configuration, since the driving electrode 6 is provided above the common electrode 7, the driving electrode 6 has no influence on the display, and it is therefore possible to realize a high display quality.

Embodiment 2

Figure 17:
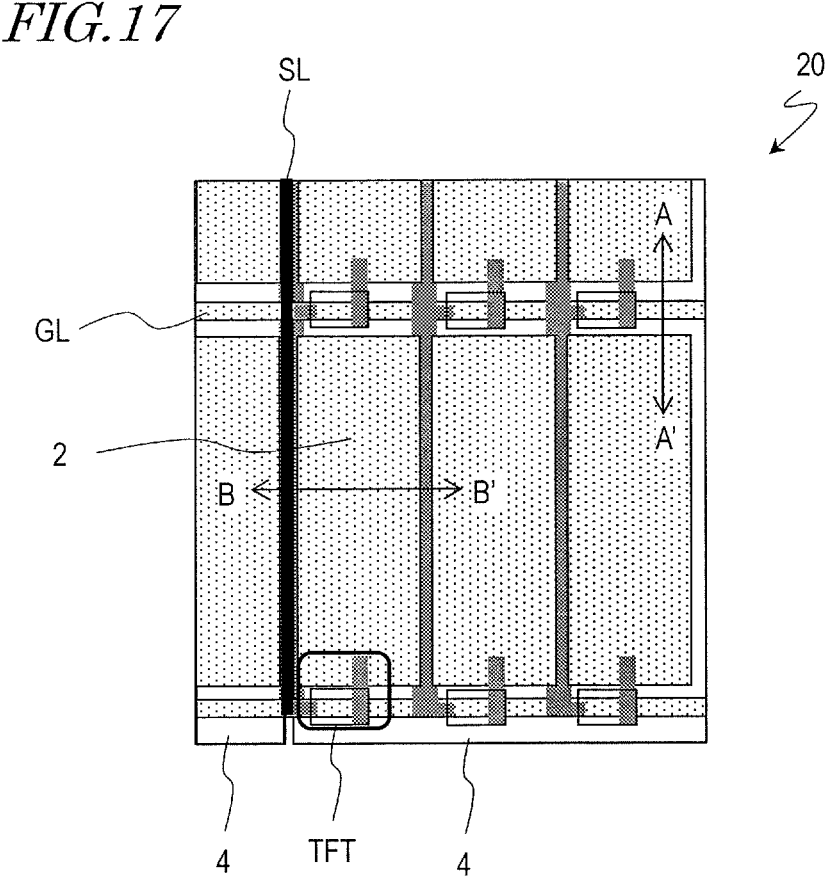
FIG. 17 A diagram showing a TFT substrate according to an embodiment of the present invention.
Figure 18:
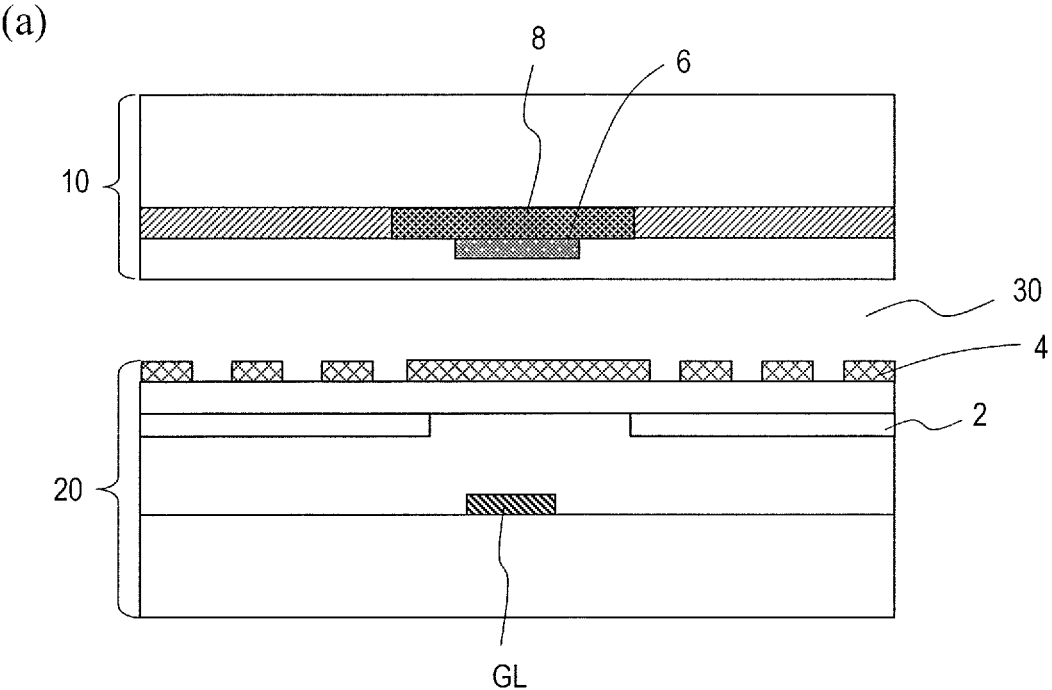
FIG. 18 (a) is a cross-sectional view taken along line AA' shown in FIG. 17, and (b) is a cross-sectional view taken along line BB' shown in FIG. 17.
Figure 18:
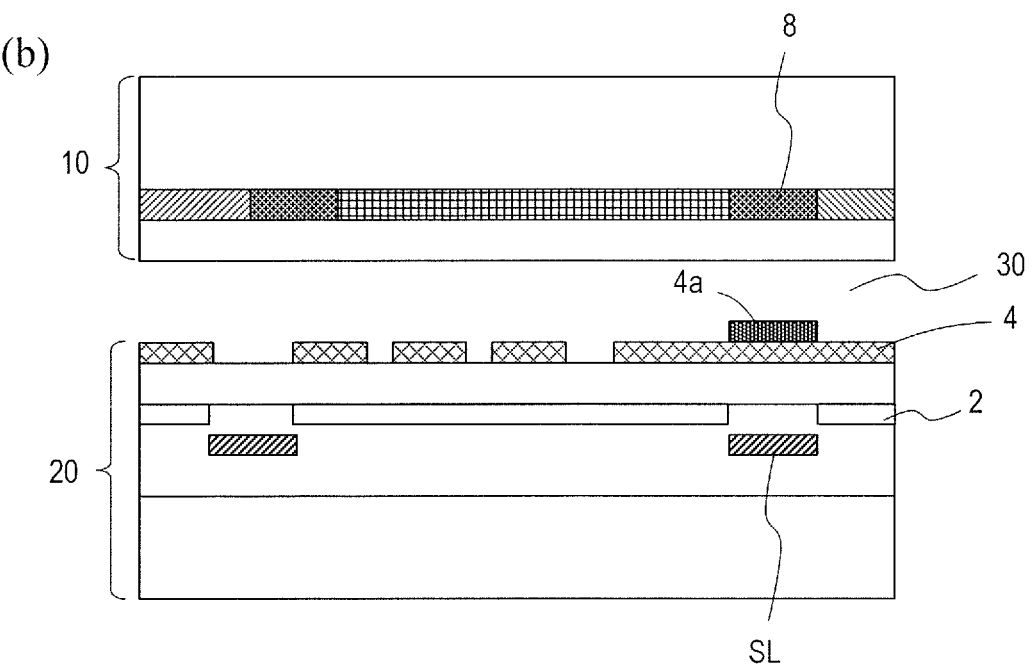

Next, a display device 100 with a touch sensor according to Embodiment 2 of the present invention will be described. FIG. 17 is a diagram showing the TFT substrate 20 of the display device 100 with a touch sensor of the present embodiment, FIG. 18(a) is a cross-sectional view taken along line AA' shown in FIG. 17, and FIG. 18(b) is a cross-sectional view taken along line BB' shown in FIG. 17.

In this example, the common electrode 4 is provided closer to the liquid crystal layer 30 than the pixel electrode 2. Since the pixel electrode 2 is absent between the driving electrode 6 of the touch sensor and the detection electrode (common electrode) 4, the touch-detecting operation is not influenced by variations, among different liquid crystal displays, in the capacitance between the pixel electrode 2 and the common electrode 4. Thus, it is possible to increase the precision of the touch-detecting operation by the output voltage Vout shown in FIG. 11(b).

Embodiment 3

Figure 19:
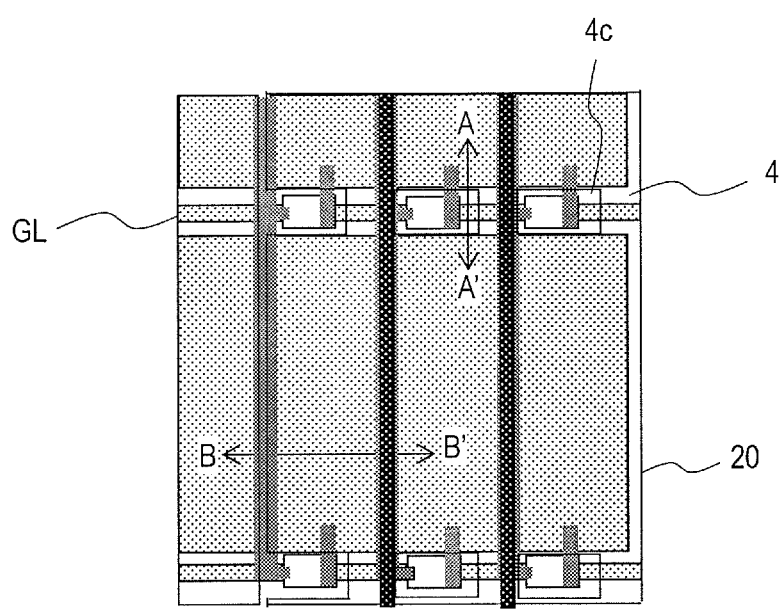
FIG. 19 A diagram showing a TFT substrate according to an embodiment of the present invention.
Figure 20:
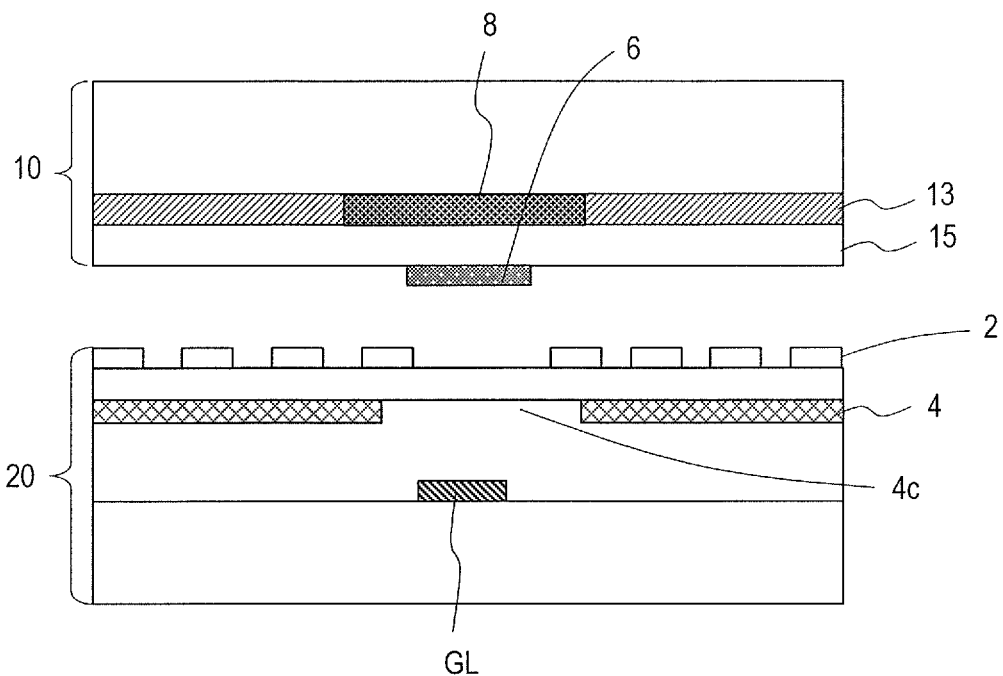
FIG. 20 (a) is a cross-sectional view taken along line AA' shown in FIG. 19, and (b) is a cross-sectional view taken along line BB' shown in FIG. 19.
Figure 20:
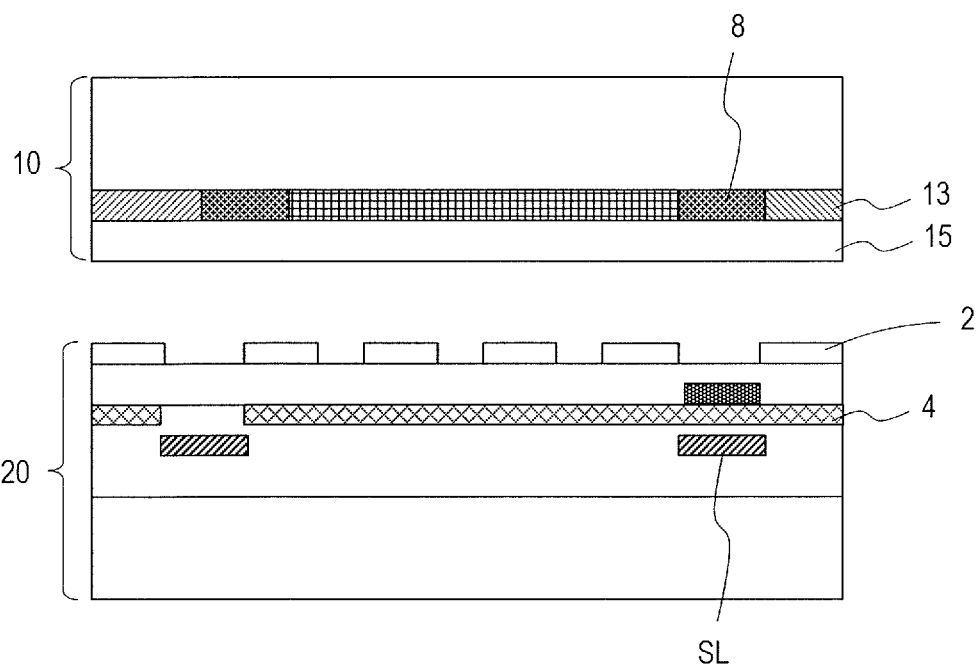

Next, a display device 100 with a touch sensor according to Embodiment 3 of the present invention will be described. FIG. 19 is a diagram showing the TFT substrate 20 of the display device 100 with a touch sensor of the present embodiment, FIG. 20(a) is a cross-sectional view taken along line AA' shown in FIG. 19, and FIG. 20(b) is a cross-sectional view taken along line BB' shown in FIG. 19.

In this example, the driving electrode 6 is provided on the liquid crystal layer side of the resin layer 15, which is provided on the color filter layer 13. A portion 4C of the pattern of the detection electrode (common electrode) 4, opposing the driving electrode 6, is removed. That is, an area of the detection electrode on the TFT substrate side that overlaps the driving electrode, as seen in a plan view, is removed by patterning, thereby making it possible to reduce the capacity load with the driving electrode 6. After the surface is planarized by providing the resin layer 15 on the color filter layer 13, the driving electrode 6 is formed thereon, thereby enabling a patterning with a high precision on the counter substrate 10.

Embodiment 4

Figure 21:
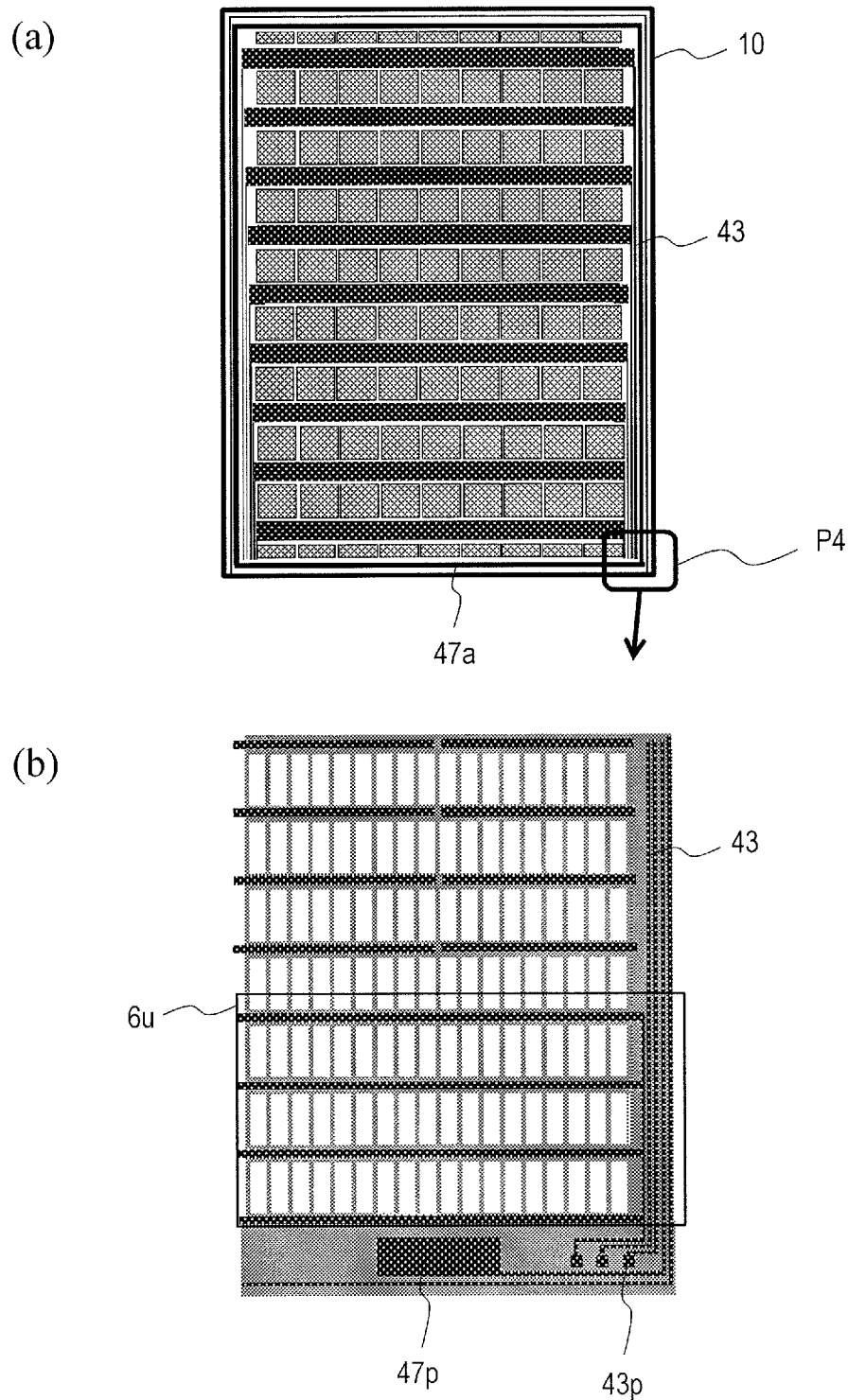
FIG. 21 (a) is a diagram showing a counter substrate according to an embodiment of the present invention, and (b) is a diagram showing a main part of a counter substrate according to an embodiment of the present invention.
Figure 22:
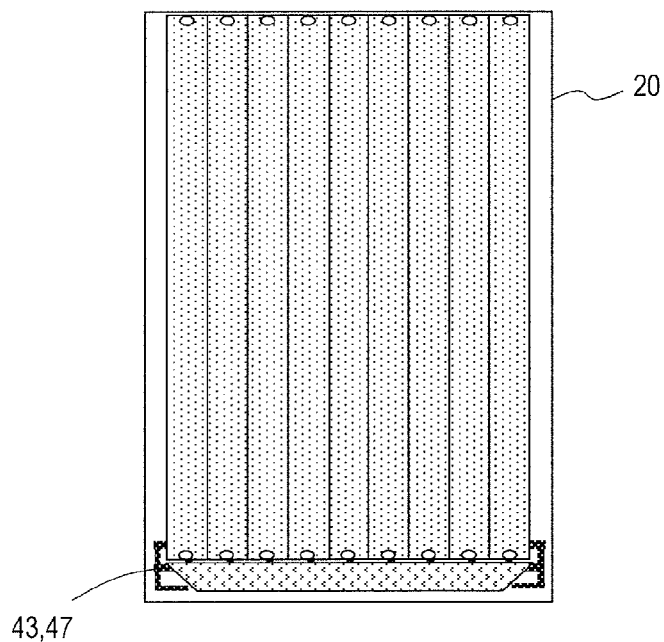
FIG. 22 (a) is a diagram showing a TFT substrate according to an embodiment of the present invention, and (b) is a diagram showing a configuration including a counter substrate and a TFT substrate attached together according to an embodiment of the present invention.
Figure 22:
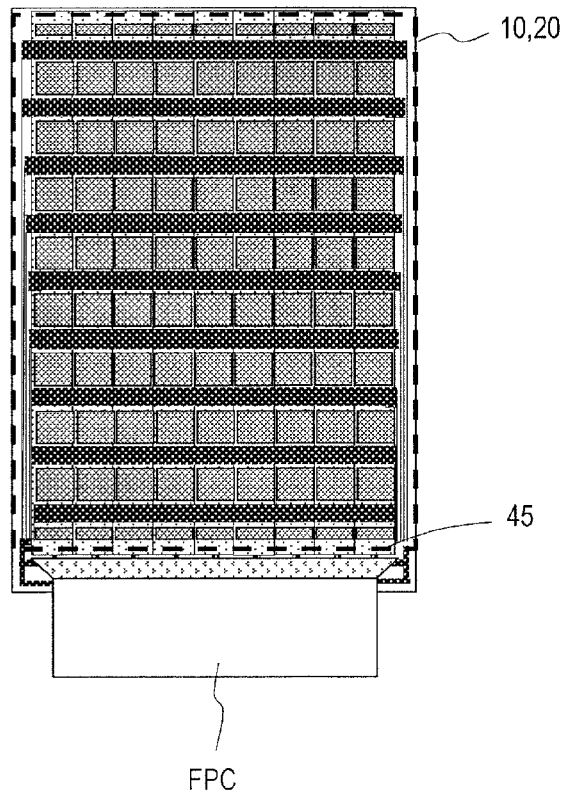

Next, a display device 100 with a touch sensor according to Embodiment 4 of the present invention will be described. FIG. 21(a) is a diagram showing the counter substrate 10 of the present embodiment, and FIG. 21(b) is an enlarged view showing a portion P4 of FIG. 21(a). FIG. 22(a) is a diagram showing the TFT substrate 20 of the present embodiment, and FIG. 22(b) is a diagram showing a configuration including the counter substrate 10 and the TFT substrate 20 attached together.

A metal wire is used as a wire for the touch sensor electrode on the counter substrate 10 side. The metal wire may be, for example, a wire of Mo, Al, Ti, Ag, Cu or W, or a laminate wire of a combination thereof.

The detection electrode wire and the auxiliary wire layer used for lowering the resistance of the common electrode, which are provided on the TFT substrate 20 side in Embodiments 1 to 3 described above, are removed, and a touch sensor driving electrode wire 43 and a common electrode auxiliary wire 47a are formed on the counter substrate 10. Moreover, a driving electrode pad 43p and a detection electrode auxiliary wire pad 47p are formed on the counter substrate 10.

The driving electrode wire 43 and a detection electrode wire 47 on the TFT substrate 20 side are preferably formed by the same layer as the scanning line wire. The driving electrode wire 43 and the detection electrode wire 47 of the TFT substrate 20 are connected to the driving electrode wire 43 and the common electrode auxiliary wire 47a provided on the counter substrate 10 by using a conductive seal (including conductive beads) that becomes conductive upon pressure-bonding only in the direction of pressure-bonding. The liquid crystal display wire and the touch panel wire are connected to a terminal area at one end of the liquid crystal display device after the attachment.

Note that the driving electrode wire 43 on the counter substrate may pass over the gate driver formed on the TFT substrate 20. The detection electrode wire 47 on the TFT substrate 20 may pass through an area that overlaps the signal line connection wire formed on the TFT substrate 20.

In the present embodiment, the resistance value can be made 1/10 to 1/1000 of that where the driving electrode is formed by a transparent electrode, and it is therefore possible to form an in-cell-type touch panel in a large-size liquid crystal display device. The auxiliary wire, which is provided on the TFT substrate 20 as the driving wire, can be formed in the same layer as the touch sensor electrode of the counter substrate 10 in the present embodiment.

Embodiment 5

Figure 23:
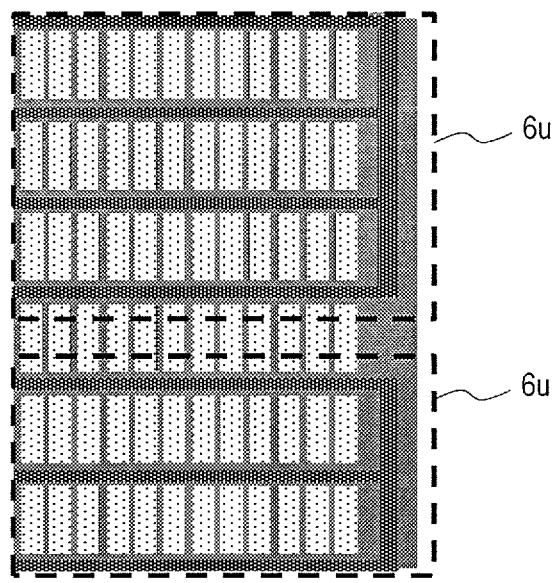
FIG. 23 (a) is a diagram showing a main part of a configuration including a counter substrate and a TFT substrate attached together according to an embodiment of the present invention, and (b) is a diagram showing a configuration including a counter substrate and a TFT substrate attached together according to an embodiment of the present invention.
Figure 23:
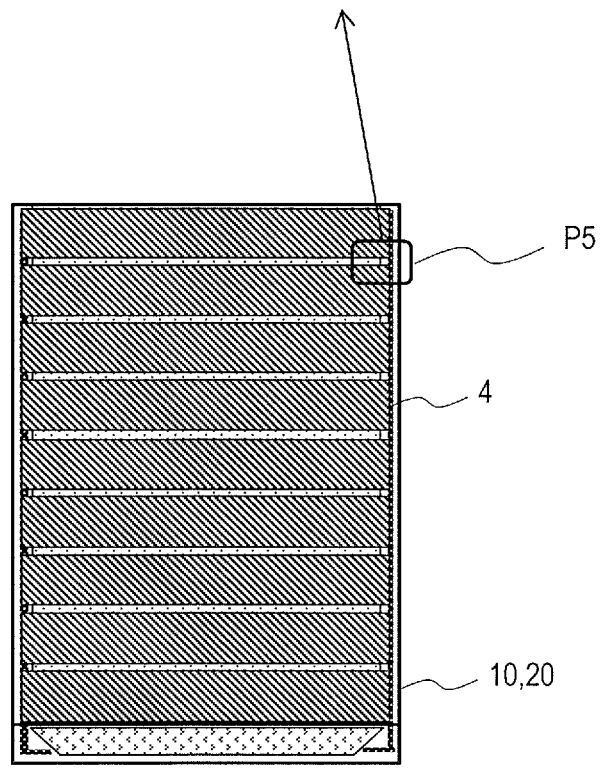
Figure 24:
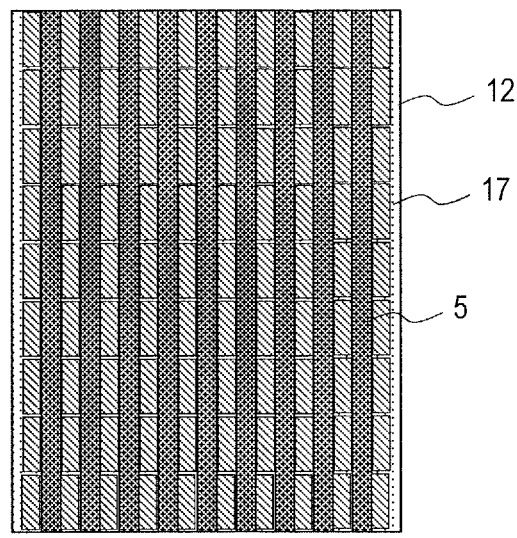
FIG. 24 (a) is a diagram showing a separately-provided substrate according to an embodiment of the present invention, and (b) is a diagram showing a configuration in which the separately-provided substrate is attached to the configuration of FIG. 23(b).
Figure 24:
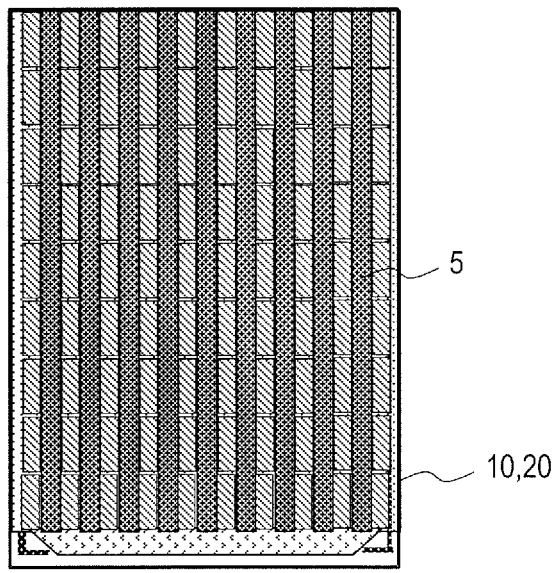

Next, a display device 100 with a touch sensor according to Embodiment 5 of the present invention will be described. FIG. 23(b) shows a configuration including the counter substrate 10 and the TFT substrate 20 attached together according to the present embodiment, FIG. 23(a) is an enlarged view showing a portion P5 of FIG. 23(b). FIG. 24(a) is a diagram showing a detection electrode 5 and a floating electrode 17 corresponding to the driving electrode pattern formed on a separately-provided substrate 12 (a glass substrate or a resin substrate of PET, or the like). FIG. 24(b) is a diagram showing a configuration including the substrate 12 attached to the configuration of FIG. 23(b).

Also in the present embodiment, the touch sensor driving electrode 6 is arranged under a thick wire of the black matrix 8 in the display area. A wire for the touch panel driving electrode is formed on the TFT substrate 20, and is connected by a conductive seal for bonding together the TFT substrate 20 and the counter substrate 10 with the liquid crystal layer interposed therebetween. The touch sensor driving electrode wire is preferably formed on the gate driver, which is formed on the TFT substrate 20.

In the present embodiment, the detection electrode 5 is provided on the separately-provided substrate 12. The detection electrode 5 is formed by a transparent electrode. The floating electrode 17, which is not electrically connected to other electrodes, may be provided on the substrate 12 in a shape that corresponds to the driving electrode pattern.

FIG. 25(a) is a diagram showing the display device 100 with a touch sensor using a negative-type liquid crystal material according to the present embodiment. FIG. 26(a) is a diagram showing the display device 100 with a touch sensor using a positive-type liquid crystal material according to the present embodiment. FIG. 27(a) is a diagram showing the display device 100 with a touch sensor using a negative-type liquid crystal material in the vertical electric field mode according to the present embodiment. In the example of FIG. 27(a), the common electrode 7 for image display may be provided on the counter substrate 10 side, with a storage capacitor 9 provided on the TFT substrate.

Figure 28:
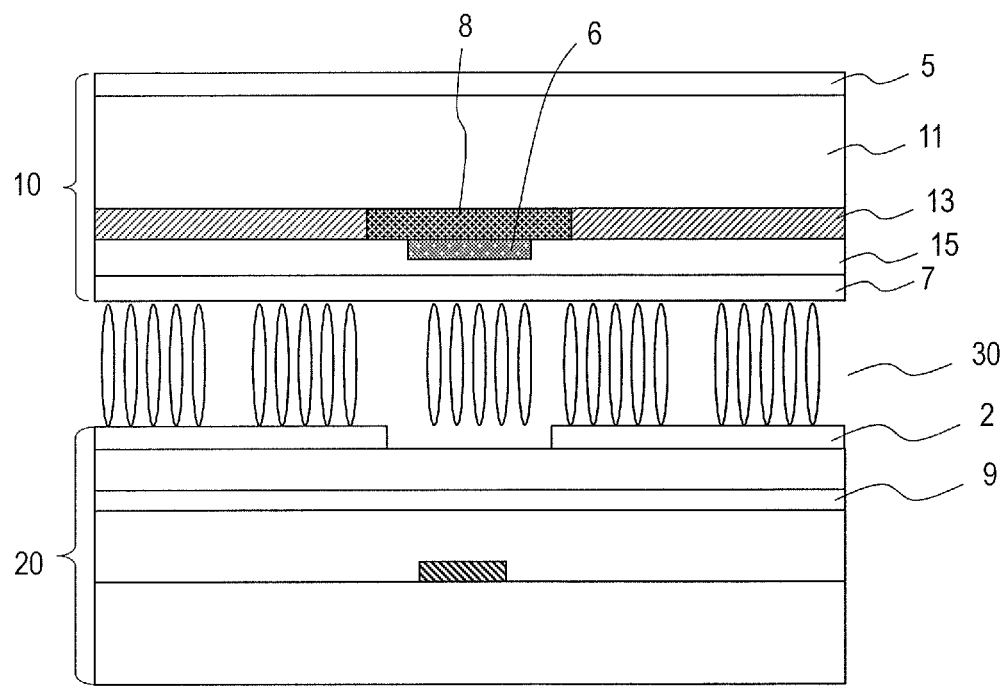
FIG. 28 A diagram showing a display device with a touch sensor using a negative-type liquid crystal material in a vertical electric field mode according to an embodiment of the present invention.

In the present embodiment, the substrate 12 including the detection electrode 5 provided thereon is provided on the observer side of the counter substrate 10 via an adhesive layer 16. In the present embodiment, the detection electrode 5 and the driving electrode 6, provided on the counter substrate 10, together form the touch sensor for a touch detection. Note that the detection electrode 5 may be provided directly on the glass substrate 11, as shown in FIG. 25(b), FIG. 26(b) and FIG. 28.

Figure 25:
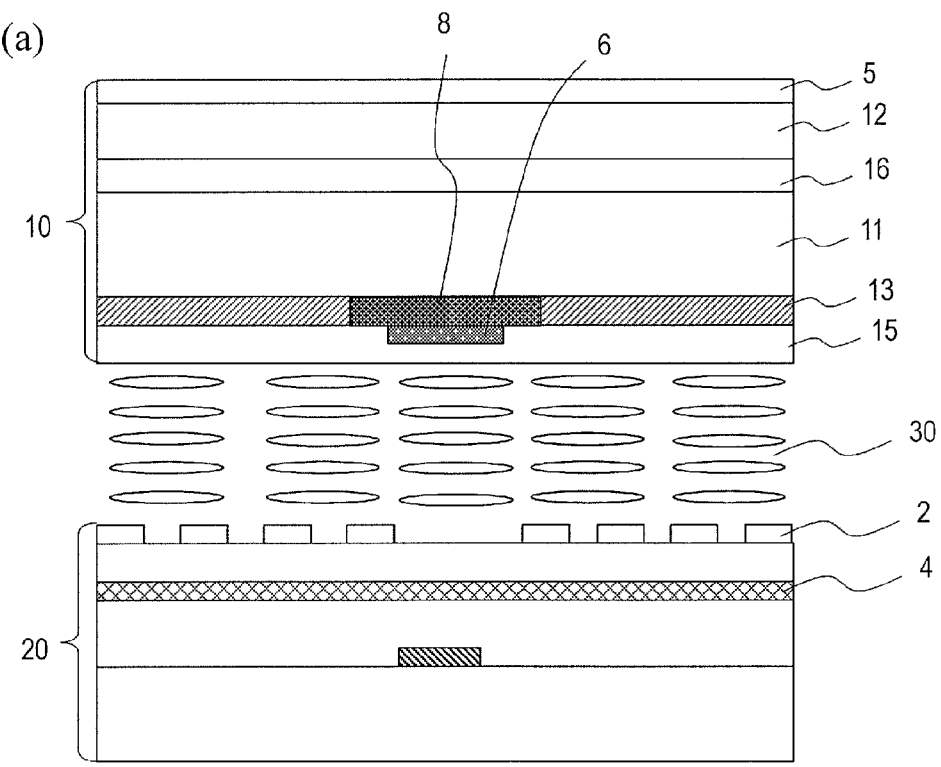
FIGS. 25 (a) and (b) are diagrams showing a display device with a touch sensor using a negative-type liquid crystal material according to an embodiment of the present invention.
Figure 25:
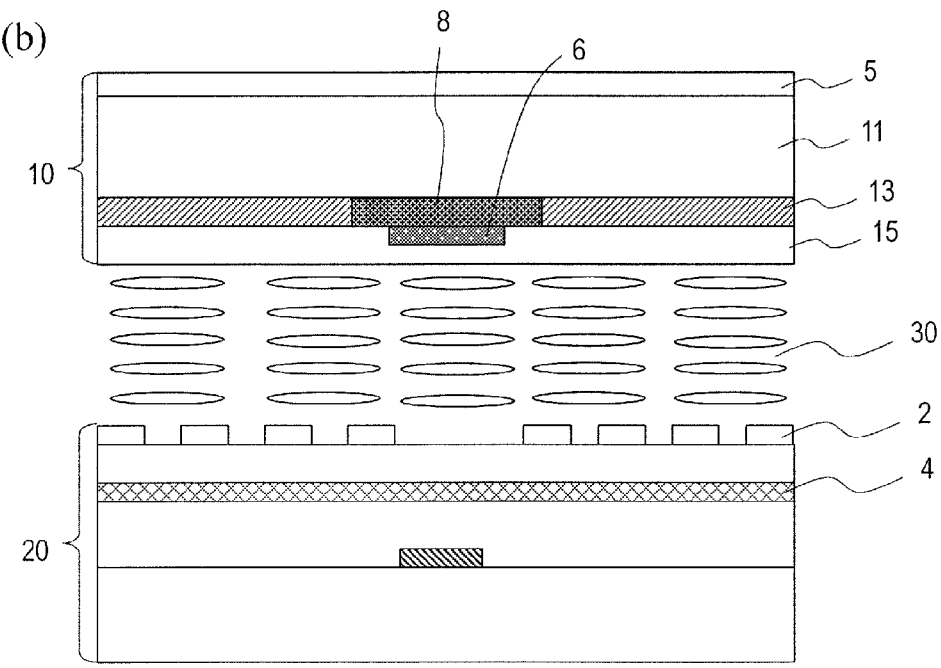
Figure 26:
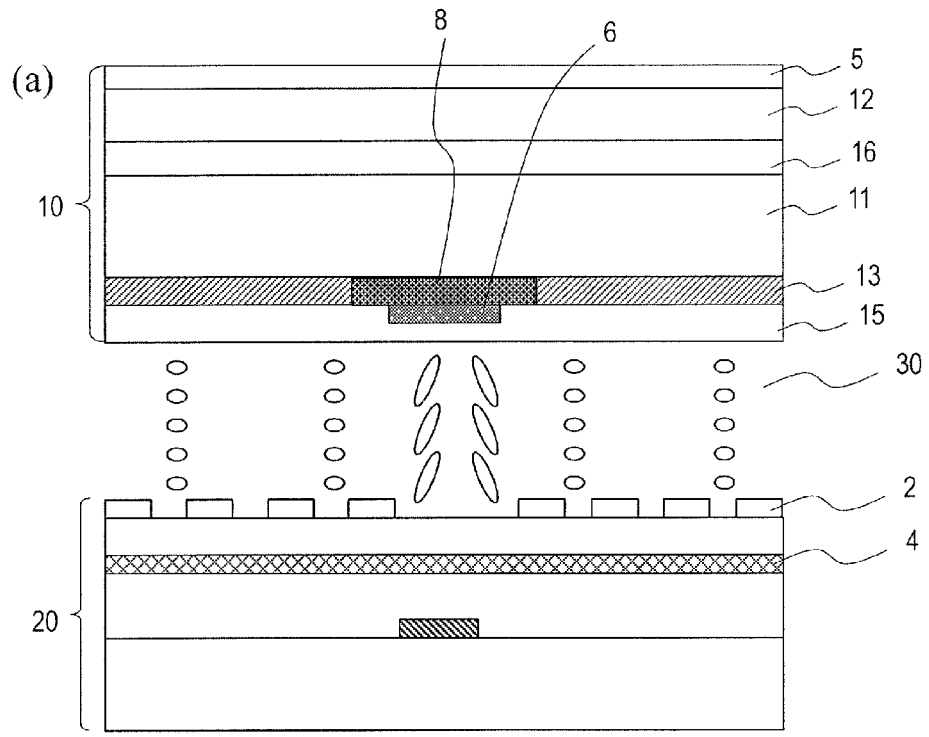
FIGS. 26 (a) and (b) are diagrams showing a display device with a touch sensor using a positive-type liquid crystal material according to an embodiment of the present invention.
Figure 26:
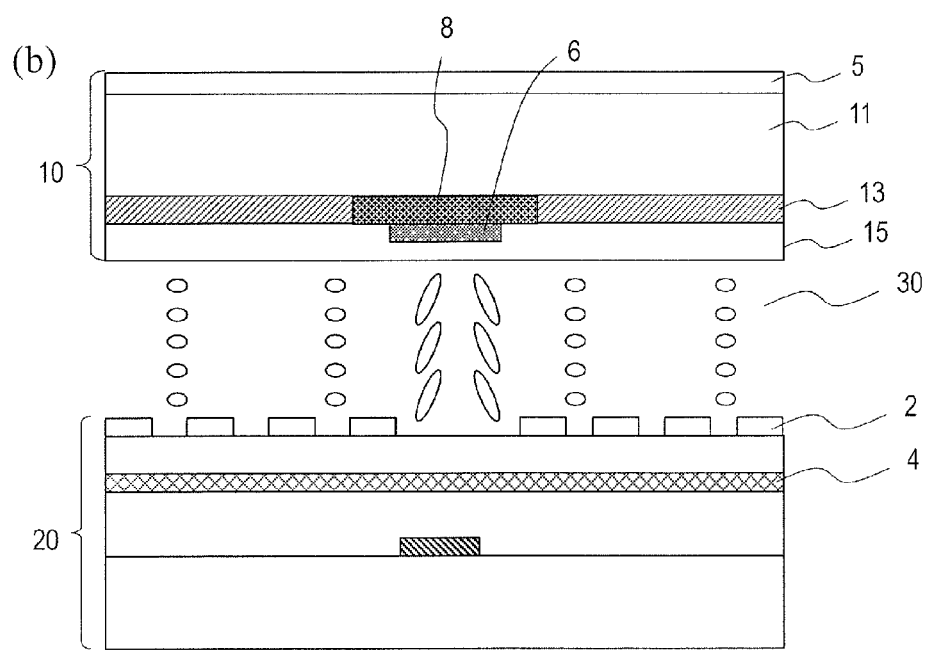
Figure 27:
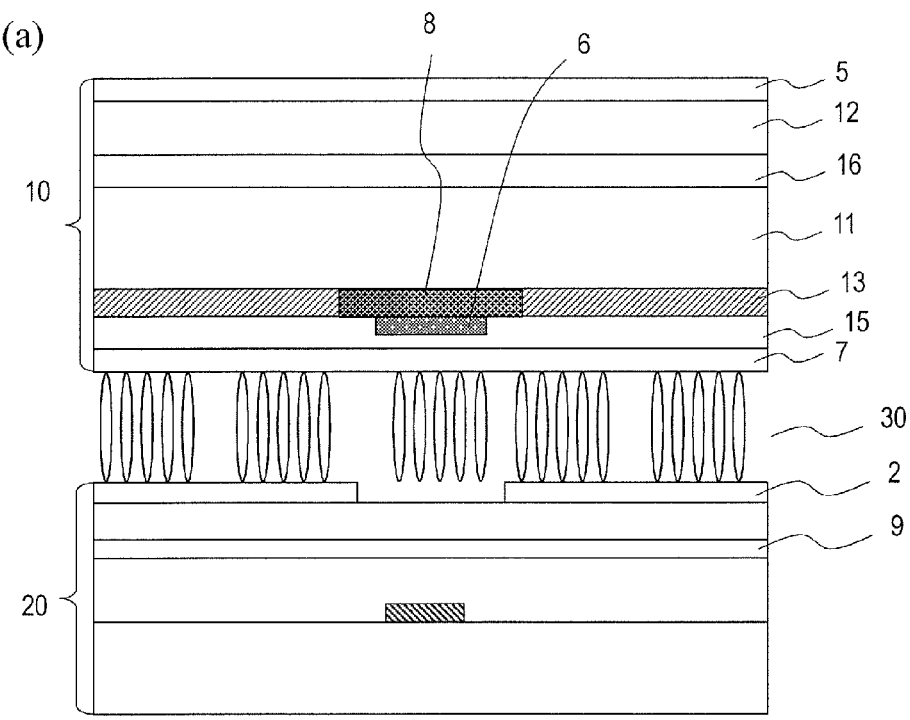
FIGS. 27 (a) and (b) are diagrams showing a display device with a touch sensor using a negative-type liquid crystal material in a vertical electric field mode according to an embodiment of the present invention.
Figure 27:
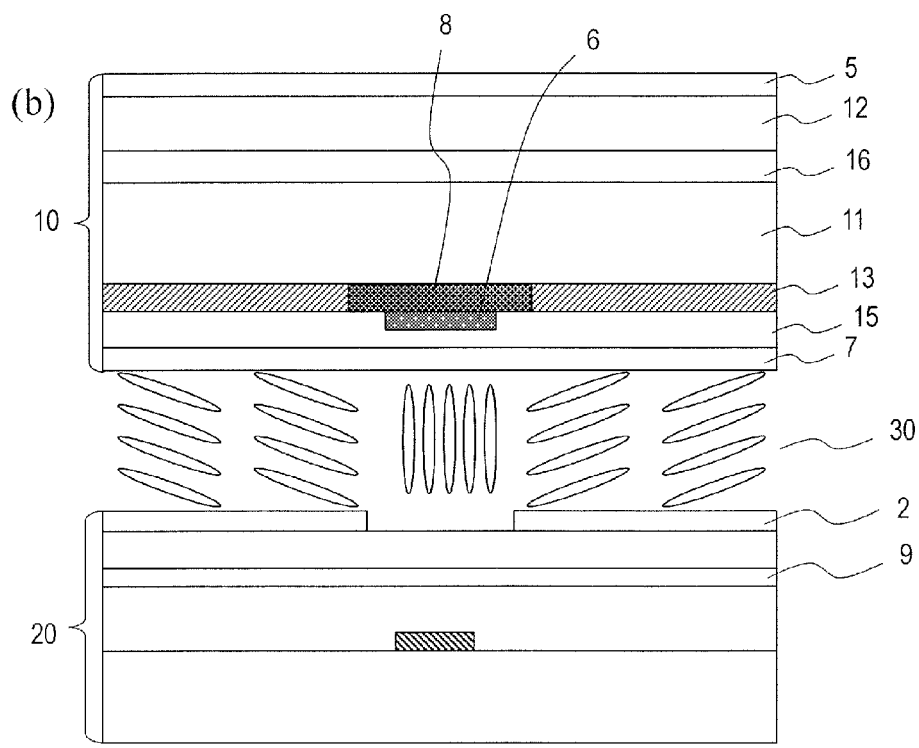

When a voltage is applied to the driving electrode 6, with a positive-type liquid crystal material, liquid crystal molecules are oriented in a direction different from that of other liquid crystal molecules therearound due to the line of electric force between the driving electrode 6 and the common electrode 4 as shown in FIG. 26, whereas with a negative-type liquid crystal material, the long-axis direction of the liquid crystal molecules is vertical to the direction of the line of electric force between the driving electrode 6 and the common electrode 4 as shown in FIG. 25, and therefore the orientation does not change. In either case, it is an area shaded by the black matrix 8 and there is little influence on the display, but it is nevertheless preferred to use a negative-type liquid crystal material with which the touch sensor driving operation has substantially no influence on the behavior of the liquid crystal molecules.

Where a liquid crystal material of a vertical electric field mode is used, the liquid crystal molecules are tilted by the line of electric force between the pixel electrode 2 and the common electrode 7 as shown in FIG. 27(b), thereby altering the display. Since the driving electrode 6 is provided above the common electrode 7, the driving electrode 6 has no influence on the display, and it is therefore possible to realize a high display quality.

Note that while the touch sensor driving electrode 6 is formed by a transparent electrode of which the sheet resistance is 100Ω or less, it is preferably formed by a metal layer of Mo, Al, Ti, Ag, Cu or W, or a laminate metal layer of a combination thereof. The detection electrode 5 may be a transparent electrode or a mesh electrode formed by a metal.

Embodiment 6

Figure 29:
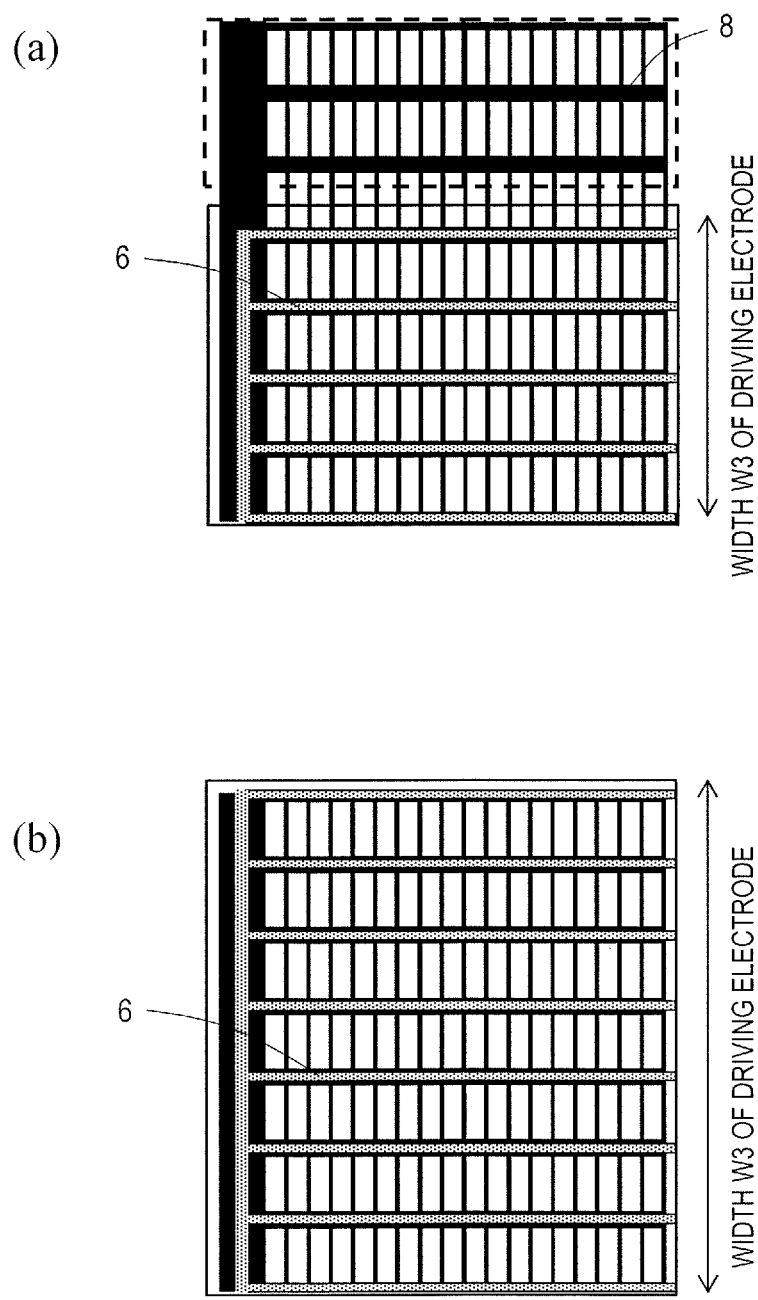
FIG. 29 (a) is a diagram showing a driving electrode provided with a width larger than the size of the touch sensor basic pattern according to an embodiment of the present invention, and (b) is a diagram showing a driving electrode provided with the same width as the size of the touch sensor basic pattern according to an embodiment of the present invention.

Next, referring to FIG. 29 to FIG. 31, a driving electrode pattern will be described.

Figure 6:
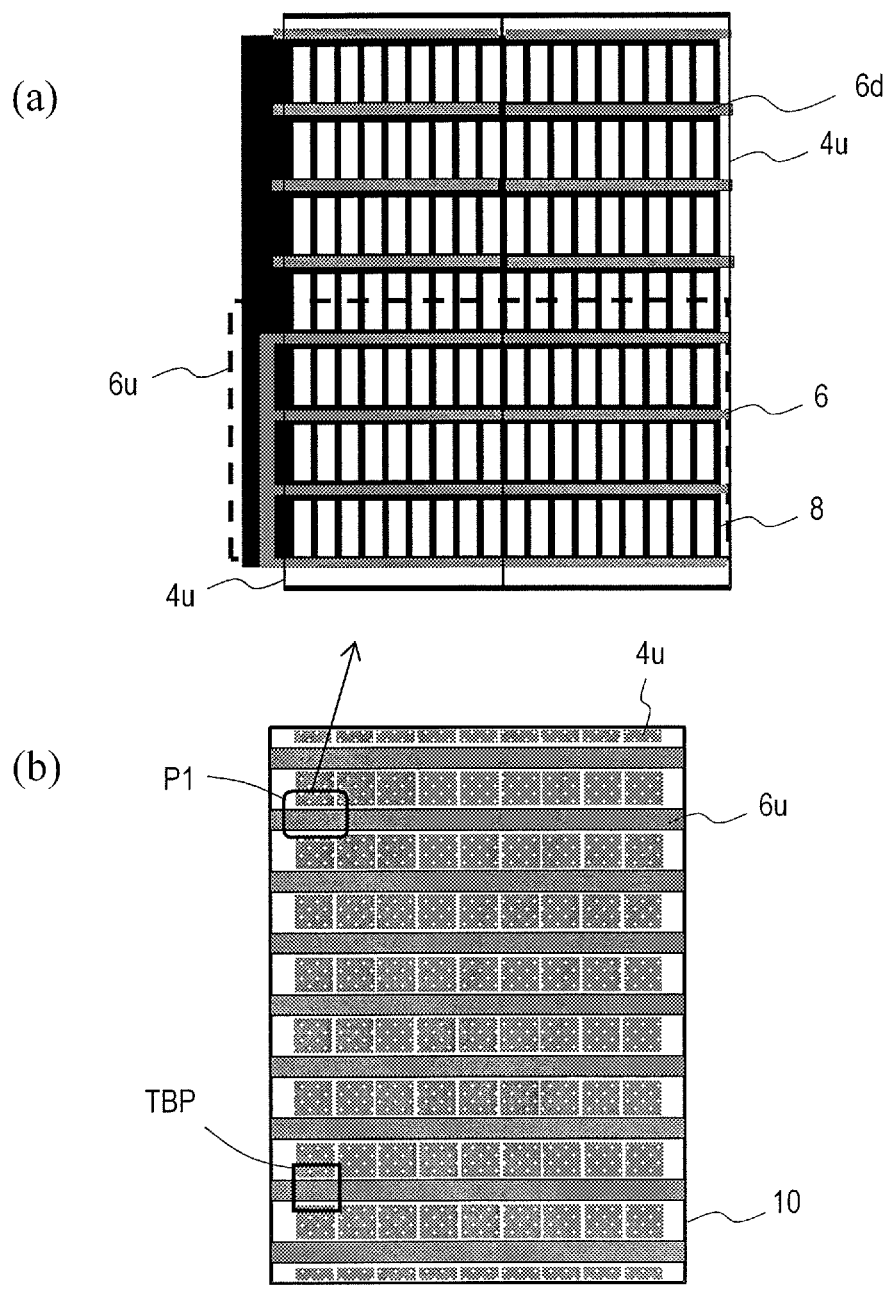
FIG. 6 (a) is a diagram showing a main part of a counter substrate according to an embodiment of the present invention, and (b) is a diagram showing a touch sensor basic pattern according to an embodiment of the present invention.

FIG. 29(b) is a diagram showing the driving electrode 6 provided with the same width as the size of the touch sensor basic pattern TBP (FIG. 6), and FIG. 29(a) is a diagram showing the driving electrode 6 provided with a narrower width than the size of the touch sensor basic pattern TBP (FIG. 6). As shown in FIG. 29(a), the width W3 of the driving electrode 6 may be narrower than the size of the touch sensor basic pattern TBP, and is preferably 10% to 100%, for example, of the size of the touch sensor basic pattern TBP. Moreover, in this case, the floating electrode may be absent in an area where the driving electrode 6 is absent.

Figure 30:
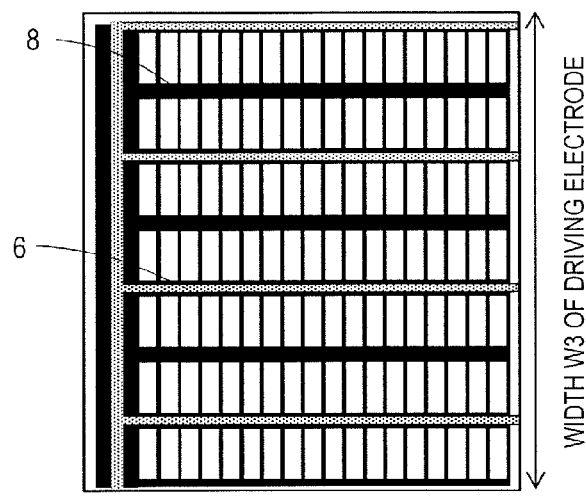
FIG. 30 A diagram showing a positional relationship between a black matrix and a driving electrode according to an embodiment of the present invention.

As shown in FIG. 30, the driving electrode 6 may be provided for every other horizontal line of the black matrix 8. In this case, the width W3 of the driving electrode 6 may be the same as or narrower than the size of the touch sensor basic pattern TBP.

Figure 31:
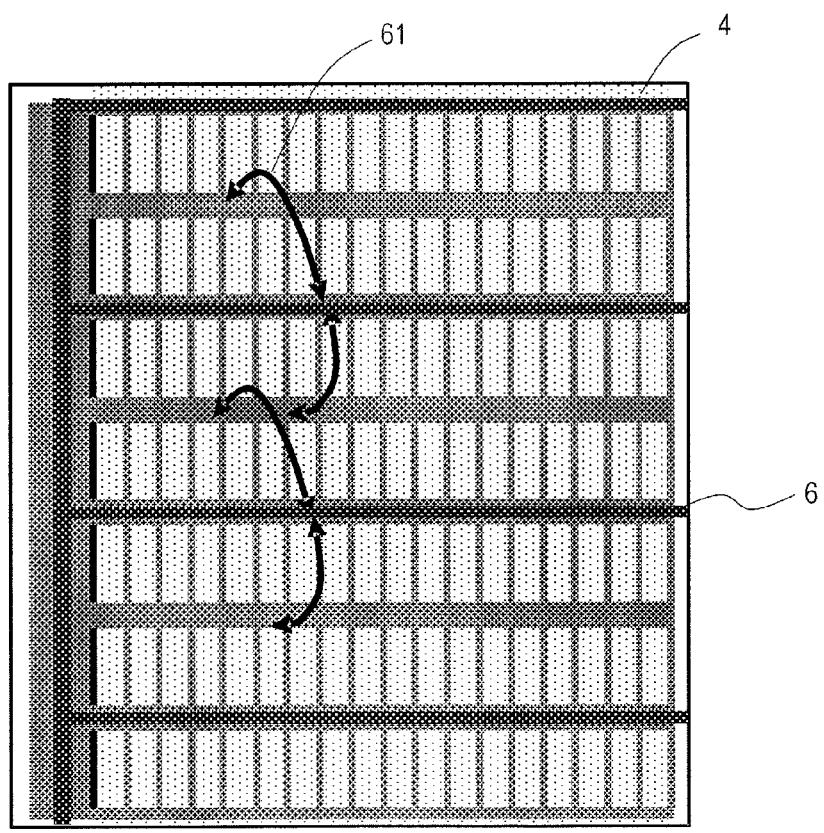
FIG. 31 A diagram showing lines of electric force generated between a driving electrode and a detection electrode according to an embodiment of the present invention.

FIG. 31 is a diagram showing a line 61 of electric force generated between the driving electrode 6 and the detection electrode 4. Since the driving electrode 6 provided on the counter substrate 10 is formed by patterning only under thick wires of the black matrix 8, even if the driving electrode 6 is provided across the entire surface, the detection electrode 4 on the TFT substrate and the line of electric force are coupled together through gaps. In view of this, by varying the density of the driving electrode 6, it is possible to make an adjustment such that it is easier to detect a change in the capacitance with respect to the distance at which the touch/no-touch detection operation is performed. By changing the density and the width of the driving electrode pattern, it is possible to adjust the touch detection position height with respect to the counter substrate 10.

Note that in the present embodiment, the floating pattern of Embodiment 1 may be removed. Then, it is possible to prevent the floating pattern from building up static electricity.

The present specification discloses display devices with a touch sensor as set forth in the following items.

[Item 1] A display device with a touch sensor including a pixel substrate including a plurality of pixel electrodes, and a counter substrate opposing the pixel substrates, the display device with a touch sensor further including:

a black matrix extending in a first direction and in a second direction different from the first direction; and a touch sensor electrode extending in the first direction, wherein:

in a plan view where the counter substrate is seen from a direction vertical to a planar direction of the counter substrate, a width in the second direction of a line of the black matrix extending in the first direction is larger than a width in the first direction of a line of the black matrix extending in the second direction;

a width in the second direction of a line of the touch sensor electrode extending in the first direction is smaller than the width in the second direction of the line of the black matrix extending in the first direction; and the line of the touch sensor electrode extending in the first direction and the line of the black matrix extending in the first direction overlap each other.

With the display device with a touch sensor according to item 1, it is possible to prevent the display quality from being lowered by the touch sensor electrode.

[Item 2] The display device with a touch sensor according to item 1, wherein the line of the touch sensor electrode extending in the first direction overlaps, by being positioned within an extent between opposite ends in the second direction of, the line of the black matrix extending in the first direction, as seen in the plan view.

With the display device with a touch sensor according to item 2, it is possible to prevent the display quality from being lowered by the touch sensor electrode.

[Item 3] The display device with a touch sensor according to item 1, wherein the touch sensor electrode is covered with a transparent resin.

With the display device with a touch sensor according to item 3, it is possible to reduce the influence of the driving voltage of the touch sensor electrode on the liquid crystal layer.

[Item 4] The display device with a touch sensor according to item 1, wherein the touch sensor electrode is a transparent electrode, and a sheet resistance value of the touch sensor electrode is 1 to 100 Ω/square.

With the display device with a touch sensor according to item 4, since the touch sensor electrode is formed under the black matrix, the touch sensor electrode does not influence the display, thereby making it possible to increase the thickness of the transparent electrode and reduce the sheet resistance.

[Item 5] The display device with a touch sensor according to item 1, wherein an electrically-floating dummy electrode is provided in one or more of a plurality of pixel areas of the counter substrate where the touch sensor electrode is absent.

[Item 6] The display device with a touch sensor according to item 1, wherein:

the touch sensor electrode is provided on the counter substrate and used as a driving electrode of the touch sensor; and a common electrode provided on the pixel substrate is used as a detection electrode of the touch sensor.

[Item 7] The display device with a touch sensor according to item 6, wherein the common electrode is divided along a signal wire provided on the pixel substrate.

[Item 8] The display device with a touch sensor according to item 6 or 7, further including:

an integration circuit receiving a signal corresponding to an amount of charge of the common electrode, wherein a reference voltage of the integration circuit is the same as a voltage applied to the common electrode during an image writing period.

With the display device with a touch sensor according to item 8, since the potential of the common electrode does not change when driving the touch sensor, it is possible to reduce the influence on the image.

[Item 9] The display device with a touch sensor according to item 8, wherein the integration circuit includes a single-ended operational amplifier.

[Item 10] The display device with a touch sensor according to item 8, wherein:

the integration circuit includes a fully differential operational amplifier; and the fully differential operational amplifier receives signals corresponding to amounts of charge of the common electrodes adjacent to each other.

[Item 11] The display device with a touch sensor according to any one of items 6 to 10, wherein an auxiliary wire electrically connected to the common electrode is provided so as to overlap a signal wire provided on the pixel substrate.

With the display device with a touch sensor according to item 11, it is possible to stably send the image signal to the common electrode having a large capacity load, and the device can quickly respond even while driving the touch sensor.

[Item 12] The display device with a touch sensor according to any one of items 1 to 10, wherein the display device with a touch sensor is a liquid crystal display device of a transverse electric field mode.

[Item 13] The display device with a touch sensor according to any one of items 1 to 12, wherein the display device with a touch sensor is a liquid crystal display device which drives a negative-type liquid crystal material in a transverse electric field mode.

[Item 14] The display device with a touch sensor according to any one of items 6 to 13, wherein a driving electrode wire of the touch sensor and a detection electrode wire of the touch sensor are provided on the pixel substrate.

[Item 15] The display device with a touch sensor according to item 14, wherein:

an auxiliary wire electrically connected to the common electrode is provided so as to overlap a signal wire provided on the pixel substrate; and the driving electrode wire and the detection electrode wire are provided in the same layer as the auxiliary wire.

[Item 16] The display device with a touch sensor according to item 14 or 15, wherein the driving electrode wire is provided so as to overlap a gate driver provided on the pixel substrate.

[Item 17] The display device with a touch sensor according to any one of items 14 to 16, wherein the detection electrode wire is provided so as to overlap a signal line connection wire provided on the pixel substrate.

[Item 18] The display device with a touch sensor according to any one of items 14 to 17, wherein:

a seal portion for bonding together the pixel substrate and the counter substrate includes a conductive material; and the driving electrode wire provided on the pixel substrate and the driving electrode provided on the counter substrate are electrically connected to each other via the seal portion.

With the display device with a touch sensor according to item 18, it is possible to prevent the bezel size from increasing because of wires for the touch sensor.

[Item 19] The display device with a touch sensor according to any one of items 14 to 18, wherein an image display terminal and a touch sensor driving terminal are provided at one end of the pixel substrate.

With the display device with a touch sensor according to item 19, the FPC provision area can be provided only in a partial area.

[Item 20] The display device with a touch sensor according to any one of items 1 to 19, wherein the touch sensor electrode is either a metal electrode or a laminate between a transparent electrode and a metal layer.

With the display device with a touch sensor according to item 20, it is possible to transmit driving signals of which the response time is short, and to accommodate large-size liquid crystal display devices.

[Item 21] The display device with a touch sensor according to any one of items 1 to 20, wherein a touch position detecting operation is synchronized with an image display operation, and the touch position detecting operation is performed while there is no image writing.

[Item 22] The display device with a touch sensor according to any one of items 1 to 21, wherein the touch position detecting operation is performed by using orthogonal code signals generated by M-sequence.

[Item 23] The display device with a touch sensor according to any one of items 1 to 5, wherein:

the touch sensor electrode is provided on the counter substrate and used as a driving electrode of the touch sensor; and a detection electrode of the touch sensor is provided at a position closer to a touch surface than a driving electrode of the touch sensor on the counter substrate.

[Item 24] The display device with a touch sensor according to item 23, wherein the display device with a touch sensor is a liquid crystal display device of a transverse electric field mode.

[Item 25] The display device with a touch sensor according to item 23 or 24, wherein the display device with a touch sensor is a liquid crystal display device which drives a negative-type liquid crystal material in a transverse electric field mode.

[Item 26] The display device with a touch sensor according to item 23 or 24, wherein the display device with a touch sensor is a liquid crystal display device which drives a positive-type liquid crystal material in a transverse electric field mode.

[Item 27] The display device with a touch sensor according to item 23, wherein the display device with a touch sensor is a liquid crystal display device which drives a negative-type liquid crystal material in a vertical electric field mode.

INDUSTRIAL APPLICABILITY

The device of the present invention is particularly useful in the field of electronic devices for detecting a touch operation.

REFERENCE SIGNS LIST

100 Display device with a touch sensor
2 Pixel electrode
4 Common electrode (detection electrode)
5 Detection electrode
4a Auxiliary wire
4b Slit
4u Position detection unit of detection electrode
6 Driving electrode
6u Position detection unit of driving electrode
6d Dummy electrode
7 Common electrode (counter electrode)
8 Black matrix
9 Storage capacitor
10 Counter substrate
11, 21 Glass substrate
12 Glass substrate or resin substrate of PET, or the like
13 Color filter layer
15 Resin layer
16 Adhesive layer
17 Floating electrode
20 Pixel substrate
23, 25 Insulating layer
30 Liquid crystal layer
31 Gate driver
33 Source driver
35 Driving electrode driver
37 Touch detection section
41 Signal line connection wire
43 Driving electrode wire
43p Driving electrode pad
45 Conductive seal
47 Detection electrode wire
47a Detection electrode auxiliary wire
47p Driving electrode pad
51 Integration circuit
53 Operational amplifier
55 Fully differential amplifier
61 Line of electric force
SL Pixel signal line
GL Scanning signal line

The invention claimed is:

1. A display device with a touch sensor comprising:
a pixel substrate including a plurality of pixel electrodes;
a counter substrate opposing the pixel substrate;
a black matrix extending in a first direction and in a second direction different from the first direction; and
a touch sensor electrode extending in the first direction, wherein:
the touch sensor electrode is provided at a position facing the pixel substrate on the counter substrate,
in a plan view where the counter substrate is seen from a direction vertical to a planar direction of the counter substrate,
a width in the second direction of a line of the black matrix extending in the first direction is larger than a width in the first direction of a line of the black matrix extending in the second direction;
a width in the second direction of a line of the touch sensor electrode extending in the first direction is smaller than the width in the second direction of the line of the black matrix extending in the first direction;
the line of the touch sensor electrode extending in the first direction overlaps, by being positioned within an extent between opposite ends in the second direction of, the line of the black matrix extending in the first direction, the touch sensor electrode is used as a driving electrode of the touch sensor, a common electrode on the pixel substrate is used as a detection electrode of the touch sensor, a driving electrode wire of the touch sensor and a detection electrode wire of the touch sensor are on the pixel substrate, a seal portion for bonding together the pixel substrate and the counter substrate includes a conductive material, and the driving electrode wire on the pixel substrate and the driving electrode on the counter substrate are electrically connected to each other via the seal portion.

2. The display device with a touch sensor according to claim 1 wherein the common electrode is divided along a signal wire provided on the pixel substrate.

3. The display device with a touch sensor according to claim 1 further comprising:

an integration circuit receiving a signal corresponding to an amount of charge of the common electrode, wherein a reference voltage of the integration circuit is the same as a voltage applied to the common electrode during an image writing period.

4. The display device with a touch sensor according to claim 3, wherein the integration circuit includes a single-ended operational amplifier.

5. The display device with a touch sensor according to claim 3, wherein:

the integration circuit includes a fully differential operational amplifier; and the fully differential operational amplifier receives signals corresponding to amounts of charge of the common electrodes adjacent to each other.

6. The display device with a touch sensor according to claim 1, wherein an auxiliary wire electrically connected to the common electrode is provided so as to overlap a signal wire provided on the pixel substrate.

7. The display device with a touch sensor according to claim 1, wherein:

an auxiliary wire electrically connected to the common electrode is provided so as to overlap a signal wire provided on the pixel substrate; and the driving electrode wire and the detection electrode wire are provided in the same layer as the auxiliary wire.

8. The display device with a touch sensor according to claim 1, wherein the driving electrode wire is provided so as to overlap a gate driver provided on the pixel substrate.

9. The display device with a touch sensor according to claim 1, wherein the detection electrode wire is provided so as to overlap a signal line connection wire provided on the pixel substrate.

10. The display device with a touch sensor according to claim 1, wherein an image display terminal and a touch sensor driving terminal are provided at one end of the pixel substrate.

11. The display device with a touch sensor according to claim 1, wherein the touch sensor electrode is either a metal electrode or a laminate between a transparent electrode and a metal layer.

12. The display device with a touch sensor according to claim 1, wherein a touch position detecting operation is synchronized with an image display operation, and the touch position detecting operation is performed while there is no image writing.

13. The display device with a touch sensor according to claim 1, wherein the touch position detecting operation is performed by using orthogonal code signals generated by M-sequence.

14. The display device with a touch sensor according to claim 1, wherein the display device with a touch sensor is a liquid crystal display device which drives a negative-type liquid crystal material in a transverse electric field mode.

15. The display device with a touch sensor according to claim 1, wherein the display device with a touch sensor is a liquid crystal display device which drives a positive-type liquid crystal material in a transverse electric field mode.

16. The display device with a touch sensor according to claim 1, wherein the display device with a touch sensor is a liquid crystal display device which drives a negative-type liquid crystal material in a vertical electric field mode.

17. A display device with a touch sensor comprising:

a pixel substrate including a plurality of pixel electrodes;

a counter substrate opposing the pixel substrate;

a black matrix extending in a first direction and in a second direction different from the first direction; and a touch sensor electrode extending in the first direction, wherein:

the touch sensor electrode is provided at a position facing the pixel substrate on the counter substrate, in a plan view where the counter substrate is viewed from a direction vertical to a planar direction of the counter substrate, a width in the second direction of a line of the black matrix extending in the first direction is larger than a width in the first direction of a line of the black matrix extending in the second direction; and a width in the second direction of a line of the touch sensor electrode extending in the first direction is smaller than the width in the second direction of the line of the black matrix extending in the first direction;

the line of the touch sensor electrode extending in the first direction overlaps, by being positioned within an extent between opposite ends in the second direction of, the line of the black matrix extending in the first direction, and a touch position detecting operation is performed by using orthogonal code signals generated by M-sequence.

18. The display device with a touch sensor according to claim 17, wherein:

the touch sensor electrode is used as a driving electrode of the touch sensor; and a common electrode provided on the pixel substrate is used as a detection electrode of the touch sensor.

19. The display device with a touch sensor according to claim 18, wherein the common electrode is divided along a signal wire provided on the pixel substrate.

20. The display device with a touch sensor according to claim 18, wherein a driving electrode wire of the touch sensor and a detection electrode wire of the touch sensor are provided on the pixel substrate.

* * * * *